(12) United States Patent
Kim et al.

(10) Patent No.: US 12,725,053 B2
(45) Date of Patent: Sep. 1, 2026

(54) SYSTEMS AND METHODS OF OPTIMIZING RESOURCE ALLOCATION USING MACHINE LEARNING AND PREDICTIVE CONTROL

(71) Applicant: Nasdaq, Inc., New York, NY (US)

(72) Inventors: Keon Shik Kim, Cambridge, MA (US); Cole Witaszek, Brooklyn, NY (US); Abram Turner, Brooklyn, NY (US)

(73) Assignee: Nasdaq, Inc., New York, NY (US)

( * ) Notice: Subject to any disclaimer, the term of this patent is extended or adjusted under 35 U.S.C. 154(b) by 499 days.

(21) Appl. No.: 17/968,215

(22) Filed: Oct. 18, 2022

(65) Prior Publication Data

US 2024/0127080 A1 Apr. 18, 2024

(51) Int. Cl.
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS 10,262,271 B1 4/2019 Doddi
11,410,111 B1 8/2022 Washam
(Continued)

FOREIGN PATENT DOCUMENTS

CN 110807543 2/2020
EP 3620982 3/2020
(Continued)

OTHER PUBLICATIONS

U.S. Appl. No. 19/182,723, filed Apr. 18, 2025, Chen et al.
(Continued)

*Primary Examiner* — Jennifer N Welch
*Assistant Examiner* — Quoc Ly Phu Phung
(74) *Attorney, Agent, or Firm* — NIXON & VANDERHYE P.C.

(57) ABSTRACT

A computer system includes a transceiver that receives over a data communications network different input data sets from one or more source computers communicating with the data communications network, where an input data set includes data objects, each data object including associated data object attributes. A processing system processes the input data sets using a predictive machine learning model to predict for a predetermined time period a list of predicted object attribute values for data objects in the input data sets. The list of predicted object attribute values is sorted to generate a current, ranked list of data objects with predicted data object attribute values, which may be modified to account for a prior ranking of data objects. A subset of lower ranked data objects from the prior ranking of data objects is replaced with a subset of higher ranked data objects from the modified, ranked list of data objects with predicted object attribute values to generate a new ranking of data objects. Performance metric(s) for data objects are calculated for data objects in the new ranking of data objects relative to benchmark data for the data objects in the new ranking of data. The predictive machine learning model may be retrained based on the performance metric(s) to improve its performance.

17 Claims, 12 Drawing Sheets

(56) References Cited

U.S. PATENT DOCUMENTS

| | | | | |
|---|---|---|---|---|
| 11,526,817 | B1 | 12/2022 | Pacheco Mendez | |
| 11,609,788 | B2 | 3/2023 | Cella | |
| 11,922,217 | B2 | 3/2024 | Chen et al. | |
| 12,282,803 | B2 | 4/2025 | Chen et al. | |
| 12,293,412 | B1 * | 5/2025 | Jang | G06F 18/2411 |
| 2009/0024546 | A1 | 1/2009 | Ficcaglia et al. | |
| 2010/0205120 | A1 | 8/2010 | Zou | |
| 2011/0004509 | A1 | 1/2011 | Wu et al. | |
| 2012/0215751 | A1 | 8/2012 | Broll et al. | |
| 2015/0106251 | A1 * | 4/2015 | Farnstrom | G06Q 40/04 705/37 |
| 2015/0161549 | A1 | 6/2015 | Modarresi | |
| 2017/0109821 | A1 * | 4/2017 | Carroll | G06Q 40/04 |
| 2019/0102799 | A1 | 4/2019 | Kwizera et al. | |
| 2019/0121867 | A1 * | 4/2019 | Misra | G06F 16/24578 |
| 2019/0303783 | A1 | 10/2019 | Utsumi | |
| 2020/0012933 | A1 | 1/2020 | Truong | |
| 2020/0104178 | A1 | 4/2020 | Cella | |
| 2020/0151743 | A1 | 5/2020 | Acriche et al. | |
| 2020/0250606 | A1 | 8/2020 | Moorthy et al. | |
| 2020/0364279 | A1 | 11/2020 | Pal et al. | |
| 2020/0364791 | A1 * | 11/2020 | Taylor | G06Q 40/04 |
| 2020/0387565 | A1 | 12/2020 | Caglar | |
| 2021/0012363 | A1 * | 1/2021 | Masuda | H04N 21/266 |
| 2021/0027320 | A1 * | 1/2021 | Schwenkler | G06Q 30/0202 |
| 2022/0012624 | A1 | 1/2022 | Ladurini | |
| 2022/0261575 | A1 * | 8/2022 | Ogawa | G06V 10/82 |
| 2022/0300821 | A1 | 9/2022 | Wang | |
| 2022/0391978 | A1 * | 12/2022 | Givot | G06Q 40/04 |
| 2023/0049418 | A1 | 2/2023 | Saha | |
| 2023/0334515 | A1 * | 10/2023 | Togawa | G06Q 30/0202 |

FOREIGN PATENT DOCUMENTS

| | | |
|---|---|---|
| WO | 2019/204355 | 10/2019 |
| WO | 2021/126272 | 6/2021 |

OTHER PUBLICATIONS

International Search Report and Written Opinion of the International Searching Authority for PCT/US2021/055551 mailed Jan. 21, 2022, 19 pages.
Office Action for EP Application No. 21892547.7 dated Sep. 13, 2024, 10 pages.
U.S. Appl. No. 17/955,640, filed Sep. 29, 2022, Kim et al.
Office Action dated Jul. 2, 2025 for U.S. Appl. No. 17/955,640, 34 pages.
Warren Landis et al., "Towards High Performance Stock Market Prediction Methods" 2020 IEEE Cloud Summit, pp. 156-160.
M. Nabigour et al, "Deep Learning for Stock Market Prediction" Entropy 2020, Published: Jul. 30, 2020, pp. 1-23.
International Search Report and Written Opinion of the International Searching Authority for PCT/US2022/045149 mailed Jan. 31, 2023, 12 pages.
International Preliminary Report on Patentability for PCT/US2022/045149 mailed Jun. 12, 2024, 25 pages.
U.S. Appl. No. 19/557,454, filed Mar. 5, 2026, KIM et al.

* cited by examiner

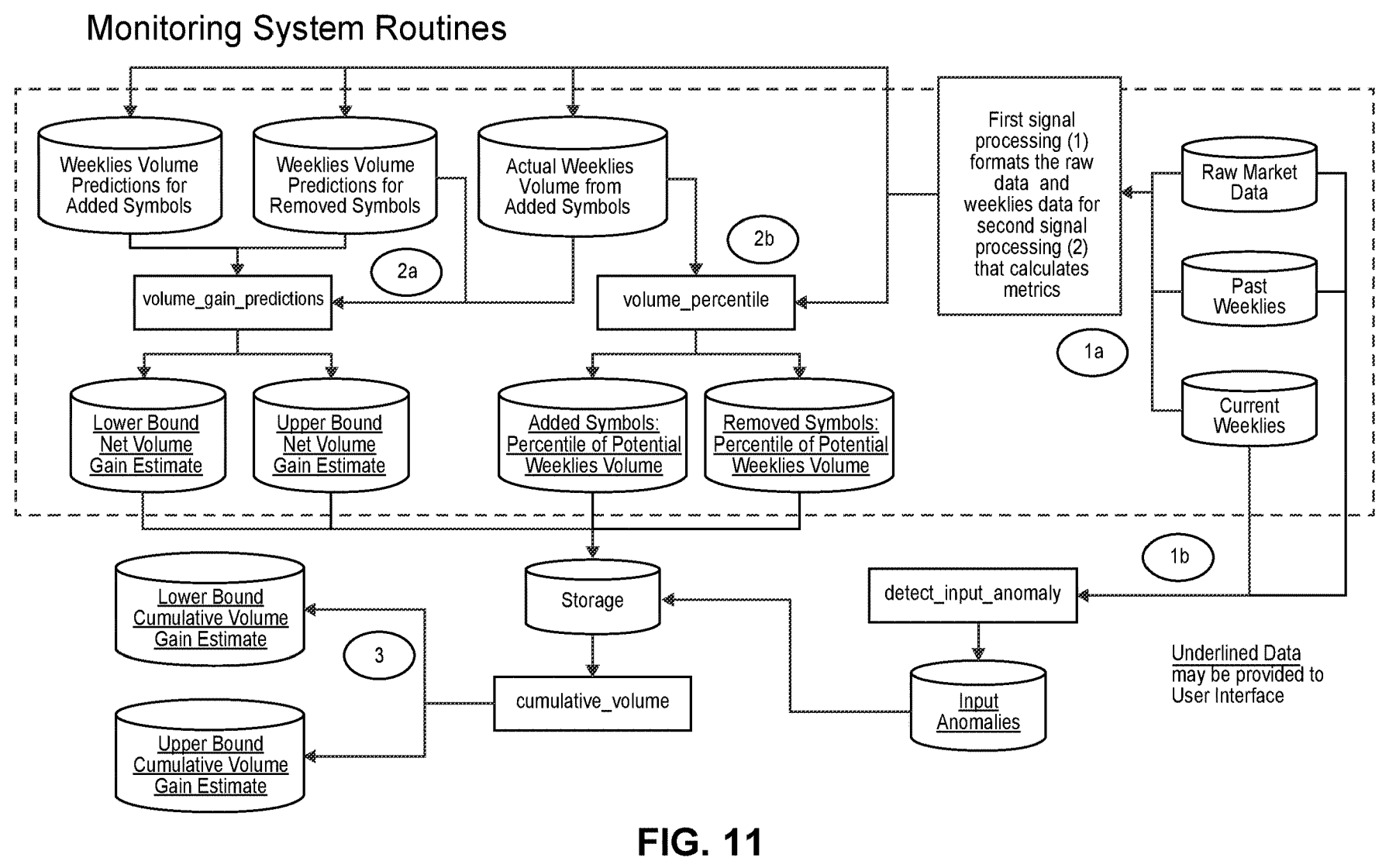

Monitoring System Routines

Raw Market Data

Past Weeklies

Current Weeklies

First signal processing (1) formats the raw data and weeklies data for second signal processing (2) that calculates metrics 1a 1b detect_input_anomaly Input Anomalies Underlined Data may be provided to User Interface Weeklies Volume Predictions for Added Symbols Weeklies Volume Predictions for Removed Symbols Actual Weeklies Volume from Added Symbols 2a 2b volume_gain_predictions volume_percentile Lower Bound Net Volume Gain Estimate Upper Bound Net Volume Gain Estimate Added Symbols: Percentile of Potential Weeklies Volume Removed Symbols: Percentile of Potential Weeklies Volume Storage cumulative_volume

3

Lower Bound Cumulative Volume Gain Estimate

Upper Bound Cumulative Volume Gain Estimate

FIG. 11

SYSTEMS AND METHODS OF OPTIMIZING RESOURCE ALLOCATION USING MACHINE LEARNING AND PREDICTIVE CONTROL

TECHNICAL OVERVIEW

The technology described in this patent application relates to optimizing allocation of computer and data communication resources in distributed computer systems using machine learning and predictive control. In example applications, the technology is used to efficiently process large numbers of data sets on an ongoing basis, e.g., daily, to generate a reduced number of data sets with a high probability of being selected for further processing, thereby optimizing the allocation of computer, data communication, and other resources to process high probability data sets.

INTRODUCTION

Many modern computer systems and platforms must process on a continual basis enormous amounts of data from many different sources, e.g., other computers communicating over a data network, for each of many possible, diverse data categories (or classes), where each data category includes many different data objects, and where each data object include multiple data object properties such as associated variables and/or parameters, with each variable and/or parameter having a range of values. A specific set of values for the data object properties associated with the data objects for a data category is referred to as a data set.

Given large numbers of different possible data sets for the data objects for each of many data categories, computer systems are confronted with significant technical challenges. Massive amounts of data must be received from one or typically multiple data communication networks and parsed, and the parsed information then being stored in one or more data memories. The parsed information is retrieved from memory for processing using one or typically multiple data processors to analyze parsed information to generate outputs including thousands, millions, or even more different possible data sets for each category's data objects. Those outputs must then be communicated over one or more data communication networks by the computer system to end users, typically at very fast speeds (low latency). Ultimately, computer systems have limited data processing and data storage resources including limited data processing speed and capacity, memory storage, power, and throughput. Furthermore, distributed computer systems have limited bandwidth over data communication networks along with latency concerns. In this situation, the computer system resources (memory storage capacity, data processing capacity, communications bandwidth, etc.) are easily overwhelmed, and the performance of the computer system (e.g., processing speed, data communication speed, power consumption, and the like) suffers. So an important objective is optimizing allocation of computer and data communication resources to manage this technically challenging situation.

Even if all of the possible data sets could be processed and communicated for every category's data objects, which is sometimes not possible, not all of the possible data sets are necessarily worth the resource costs because oftentimes only a smaller subset of data sets is of significant interest to end users. Another technical challenge is how to reliably predict which smaller subset of the data sets will ultimately turn out to be of significant end use value, e.g., of interest to end users. Accordingly, a data processing system and/or technique is needed that efficiently and accurately identifies a subset of data sets that have a high probability of being of significant interest to end users so that computer system resources can be optimally allocated to that subset of data sets.

An additional technical challenge is that many computer systems function in a rapidly changing environment where data categories, data objects, data object properties, and data set all change. A further need is for the computer system to automatically monitor and identify these changes and adapt itself rapidly and accurately in response.

More generally, there is a technical challenge of how to optimize allocation of limited resources in complex data processing applications where the data processing environment changes and perhaps quite rapidly.

Accordingly, it will be appreciated that new and improved techniques, systems, and processes are continually sought after in these and other areas of technology to address these technical challenges.

SUMMARY

A computer system obtains different input data sets, where an input data set includes data objects, each data object including associated data object attributes. A processing system processes the input data sets using a predictive machine learning model to predict for a predetermined time period a list of predicted object attribute values for data objects in the input data sets. The list of predicted object attribute values is sorted to generate a current, ranked list of data objects with predicted data object attribute values, which may be modified to account for a prior ranking of data objects. A subset of lower ranked data objects from the prior ranking of data objects is replaced with a subset of higher ranked data objects from the modified, ranked list of data objects with predicted object attribute values to generate a new ranking of data objects. Performance metric(s) for data objects are calculated for data objects in the new ranking of data objects relative to benchmark data for the data objects in the new ranking of data. The predictive machine learning model may be retrained based on the performance metric(s) to improve its performance.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 11 is a diagram showing an example monitoring module for the system shown in FIG. 6 and various monitoring routines implemented by the monitoring module according to example embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Figure 12:
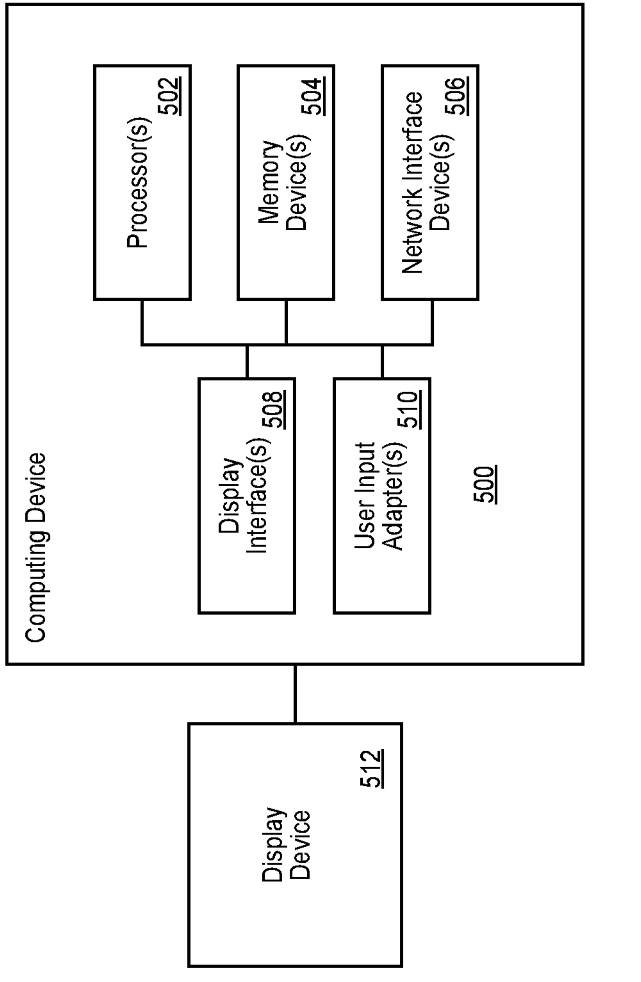
FIG. 12 shows an example computing system that may be used in some embodiments to implement features described herein.

Certain example embodiments relate to a computer system that includes a transceiver to receive over a data communications network different input data sets from multiple source nodes and a processing system including at least one hardware processor (e.g., the computing node 500 shown in FIG. 12). An input data set includes data objects, and each data object includes associated data object attributes. The processing system processes the input data sets using a predictive machine learning model to predict for a predetermined time period a list of predicted object attribute values for data objects in the input data sets. The list of predicted object attribute values is sorted to generate a current, ranked list of data objects with predicted data object attribute values, which may be modified to account for a prior ranking of data objects. A subset of lower ranked data objects from the prior ranking of data objects is replaced with a subset of higher ranked data objects from the modified, ranked list of data objects with predicted object attribute values to generate a new ranking of data objects. Performance metric(s) are calculated for data objects in the new ranking of data objects relative to benchmark data for the data objects in the new ranking of data. The predictive machine learning model may be retrained based on the performance metric(s) to improve its performance.

The technological improvements offered by the technology described in this application can be applied in any domain that requires or would benefit from resource allocation. Non-limiting and non-exhaustive examples of different domains include electronic trading platforms, retail shelf space management, data packet routing over networks, airline fleet scheduling, cargo space optimization for containers optimization, budgeting and/or investment allocation, allocation of limited medical resources (e.g., vaccines, ventilators, etc.), especially if those who have had access to treatment (e.g., a first round of vaccines, etc.) have some immunity that declines over time (rolls off), etc.

Example embodiments provided in the description analyzes very large amounts of data for each of many possible, diverse data objects (e.g., including thousands, millions, or even more different data sets the data objects) and narrows those large data amounts to identify a subset of data objects that are worth the processing resources required to generate useful data, e.g., that have a high probability of being of significant interest to end users. Less data to be communicated, stored, and processed means there is lower consumption of other computer system resources like memory storage capacity and data processing capacity as well as power consumption. It also means less data needs to be communicated over data communication networks by the computer system to end users, which reduces bandwidth and network power requirements. The result is improved performance of the computer system including faster processing speed (lower latency), faster data communication speed (lower latency), lower power consumption, and the like.

Predictive machine learning coupled with control logic (described below) provide another technical advantage of narrowing the large amounts of data intelligently, in terms of efficiency, accuracy, and relevance.

The monitoring module performs both machine learning model retraining and updating of control parameters which offer further technical advantages in that the computer system functions well in and adapts to a rapidly changing environment where the many data objects and their attributes in various data sets change as does the relevance of the data objects. The computer system monitors and identifies such changes and adapts the computer system, e.g., by training and retraining predictive machine learning model(s) and/or by updating control parameters based on feedback associated with those changes, to rapidly and accurately respond and adapt to the changes.

Figure 1:
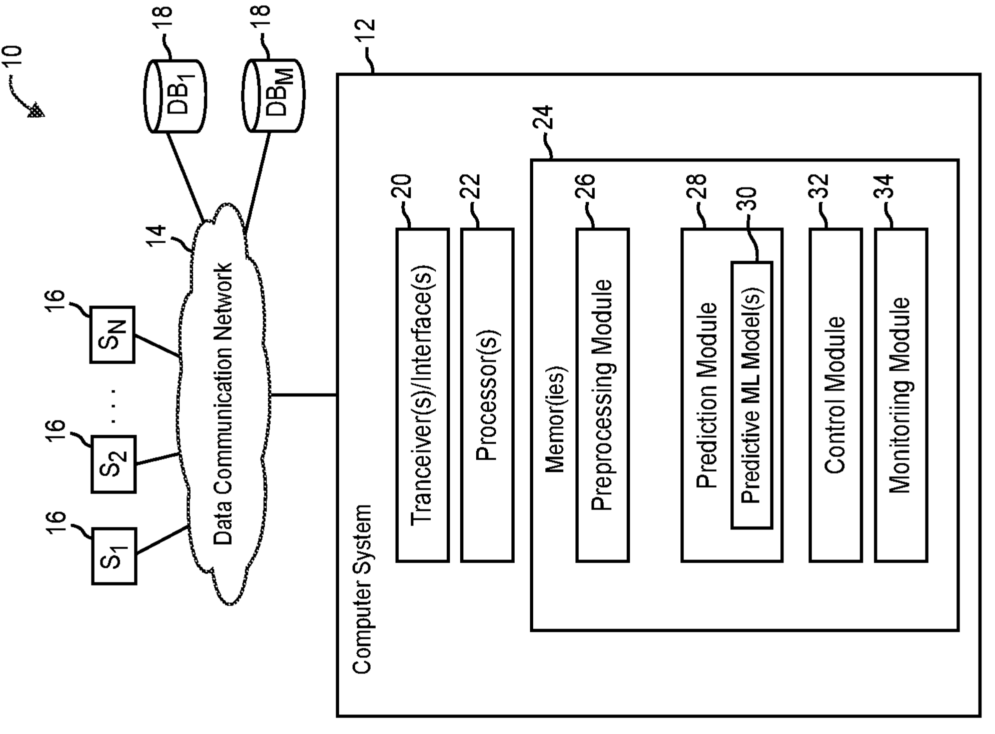
FIG. 1 is an example computer system diagram according to certain example embodiments.
Figure 2:
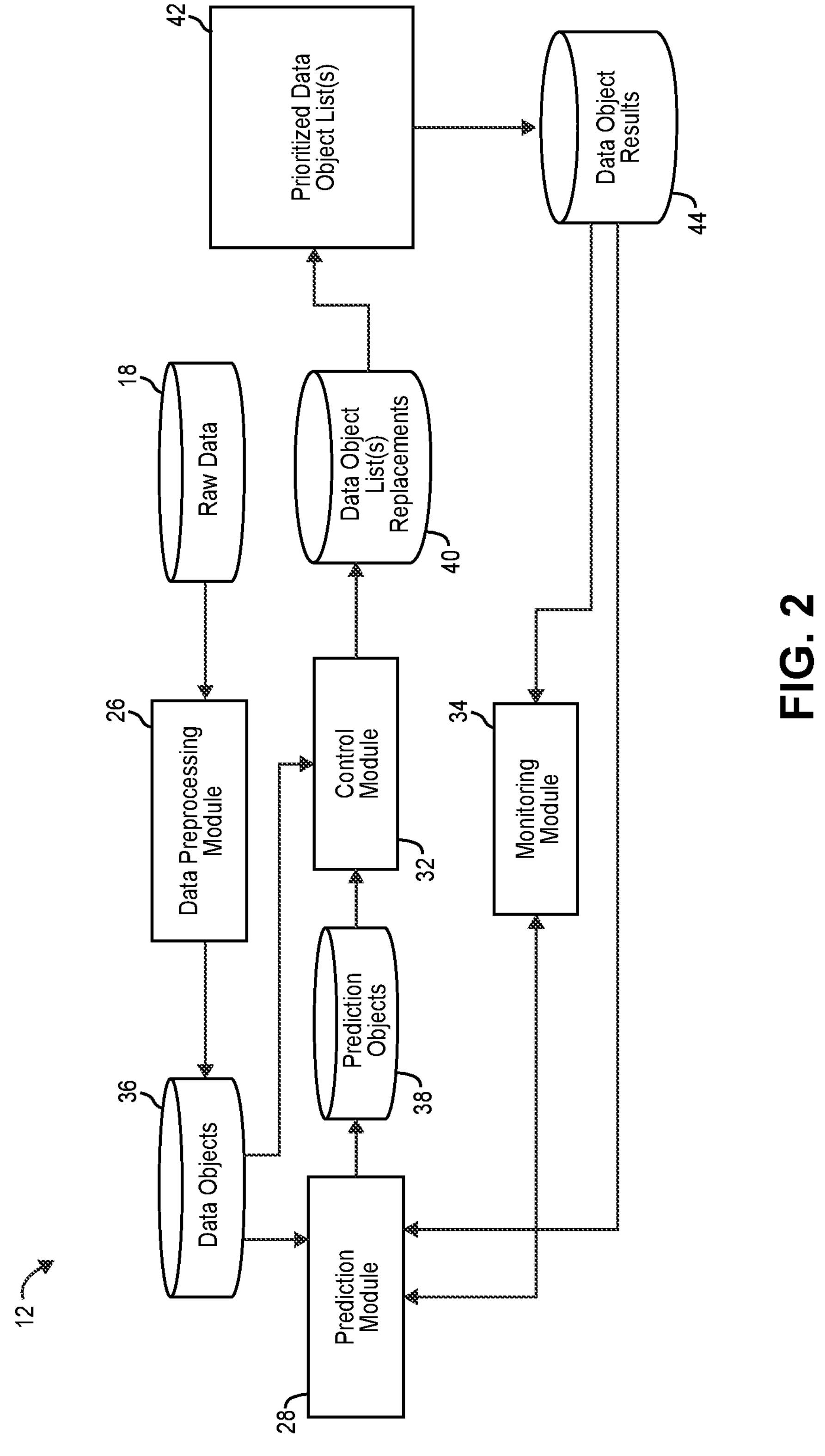
FIG. 2 illustrates a function block diagram showing data communications between various computer and data storage entities in the computer architecture of FIG. 1 according to certain example embodiments.
Figure 3:
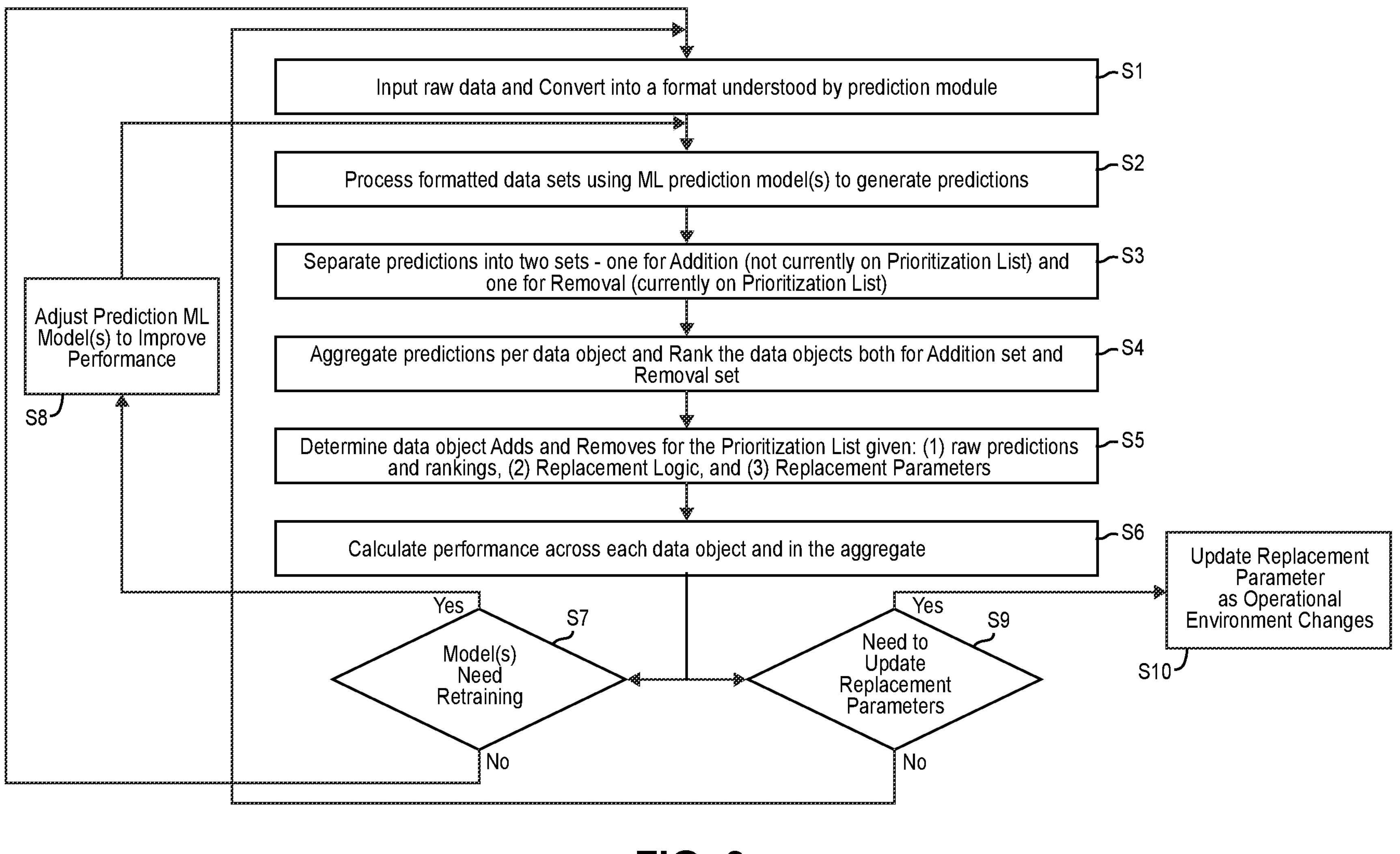
FIG. 3 is a flowchart showing example computer-implemented procedures according to certain example embodiments.
Figure 4:
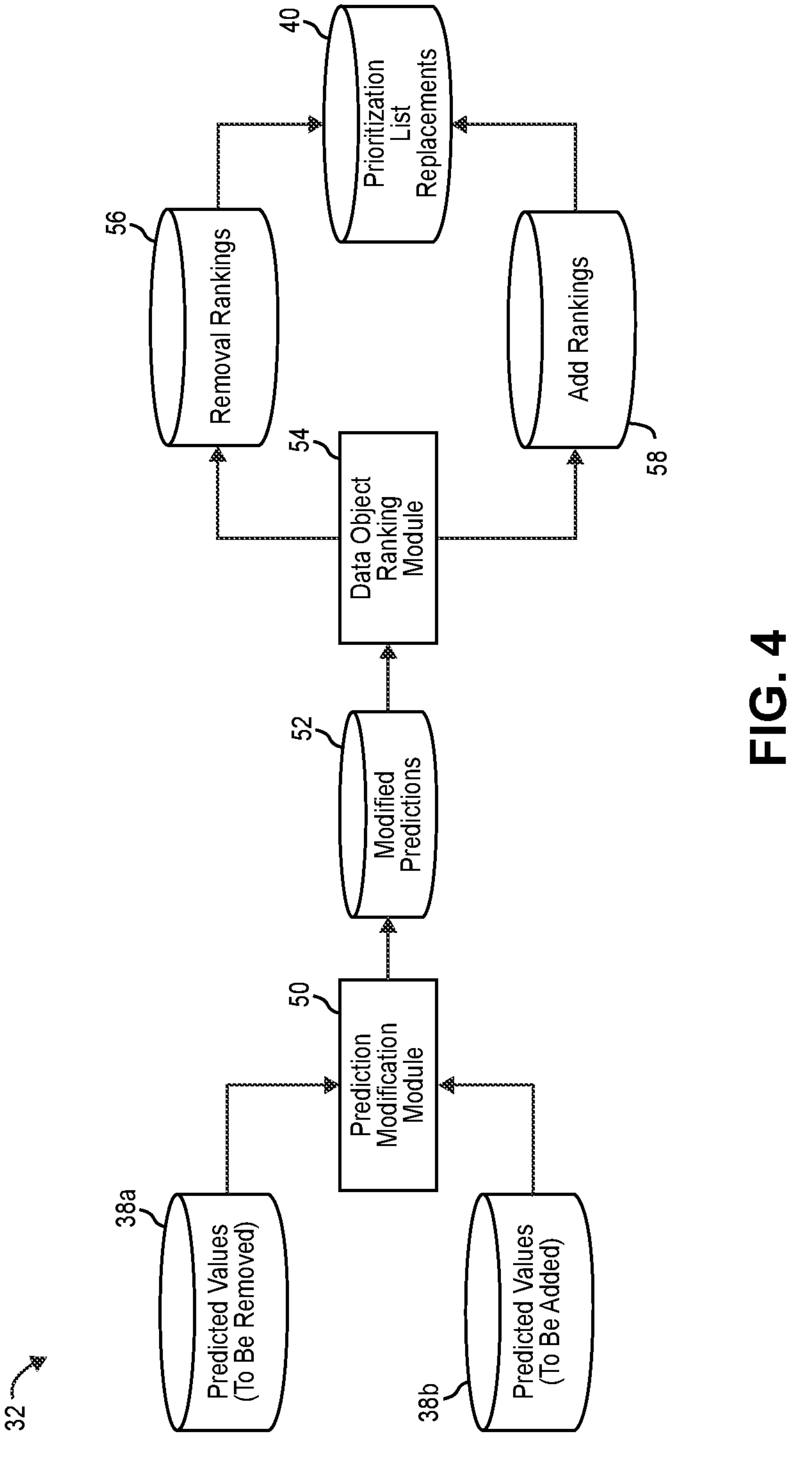
FIG. 4 is a diagram illustrating operation of an example control module.
Figure 5:
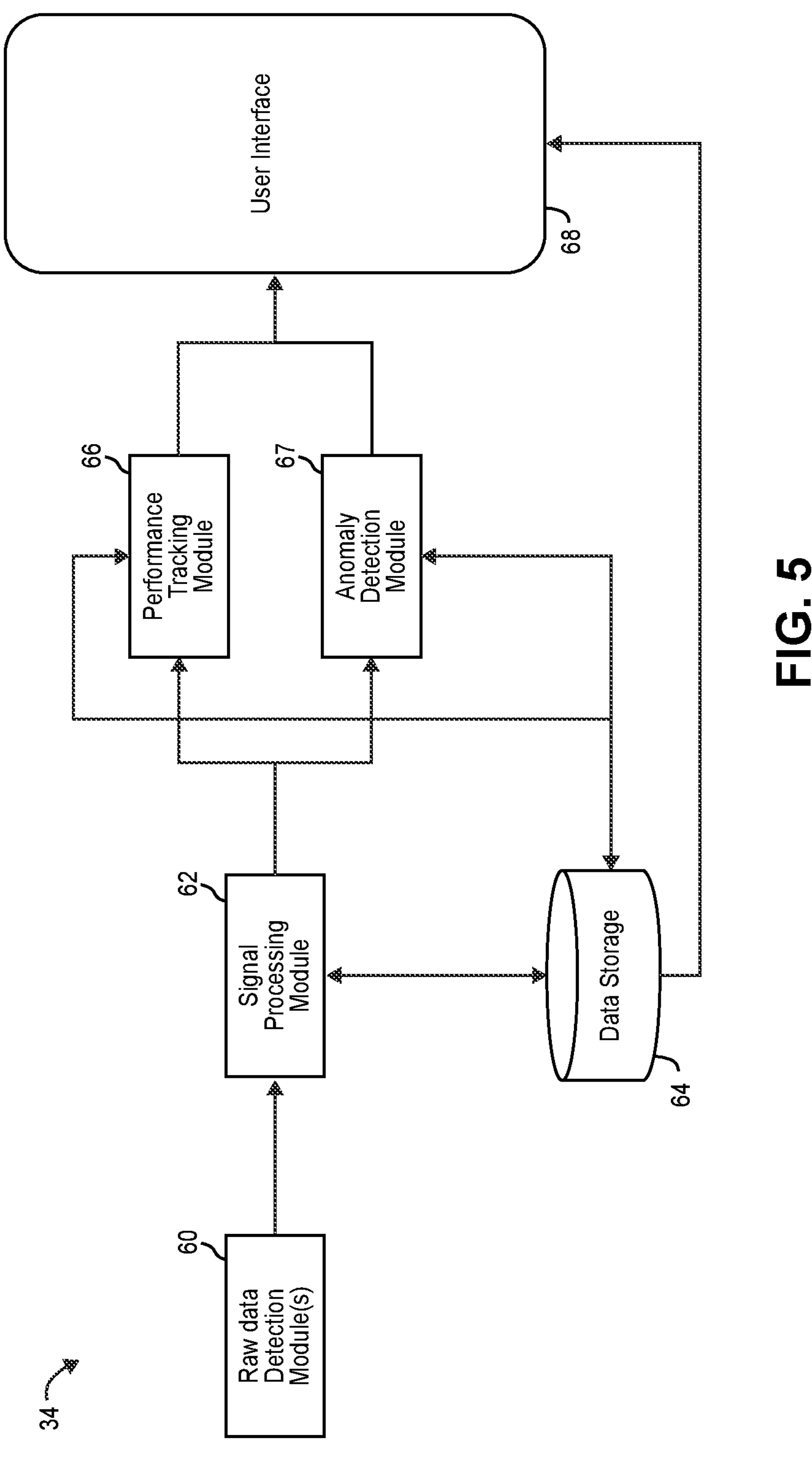
FIG. 5 is a diagram illustrating operation of an example monitoring module.
Figure 6:
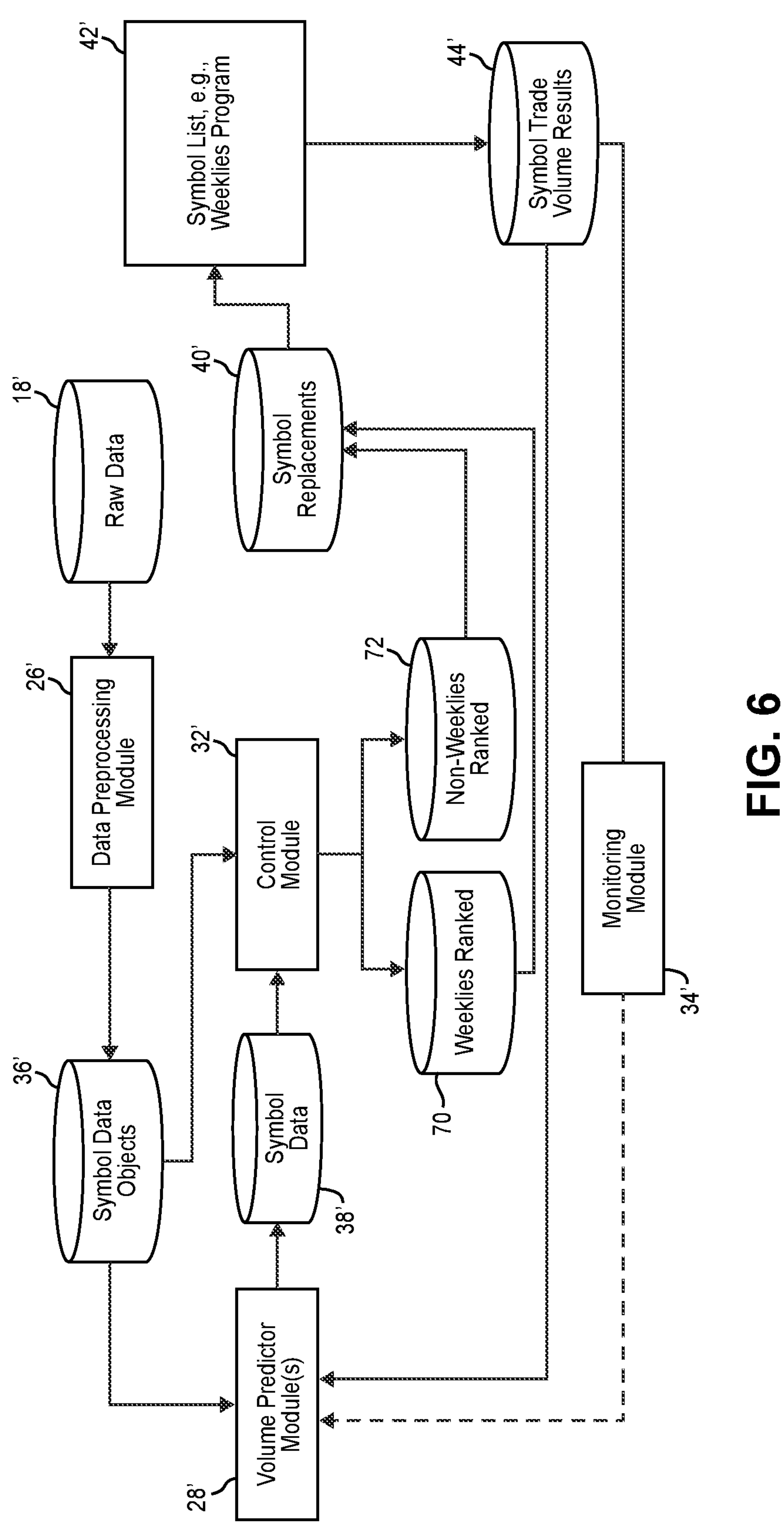
FIG. 6 a system diagram of a particular example application to an symbol volume prediction system according to certain example embodiments.
Figure 7:
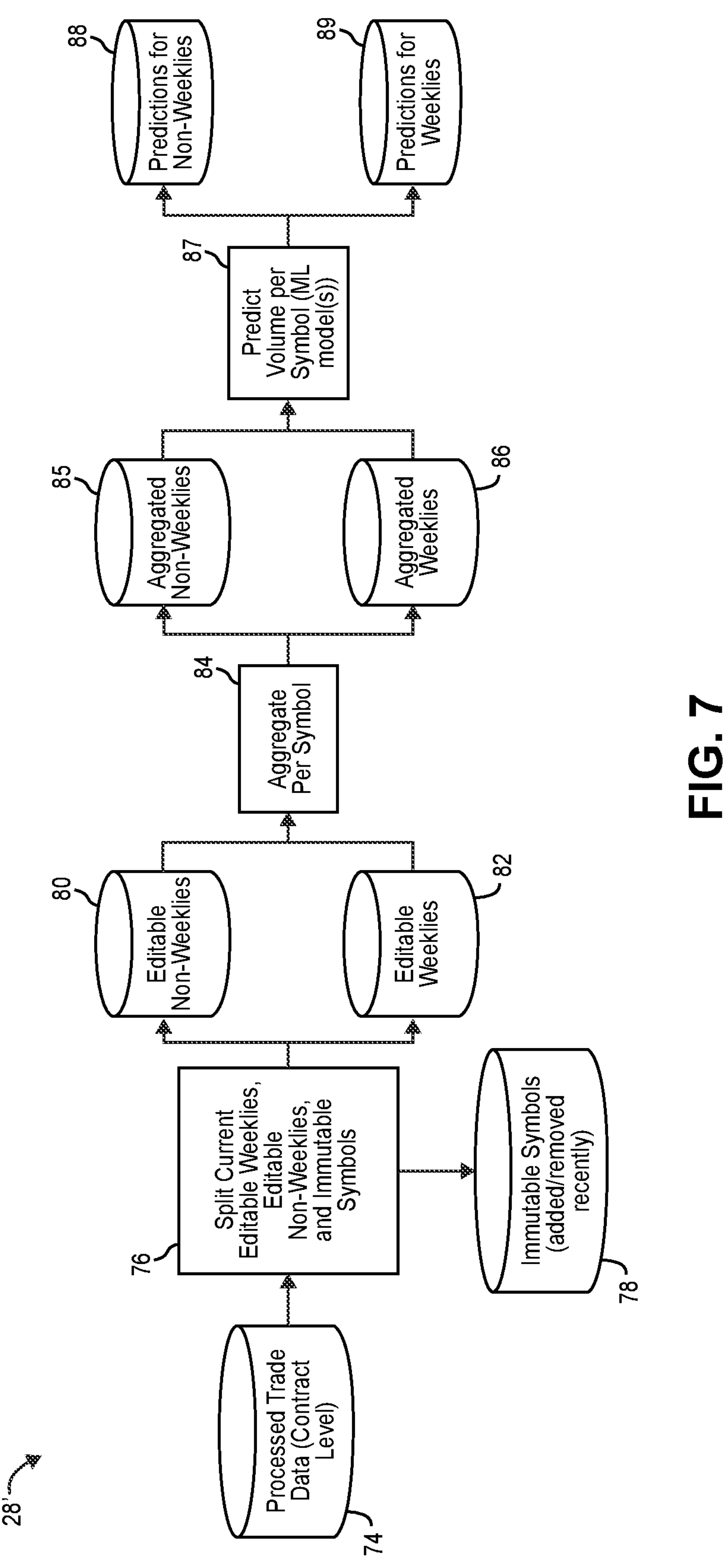
FIG. 7 is a diagram illustrating operation of an example volume prediction module for the system shown in FIG. 6 according to example embodiments.
Figure 8:
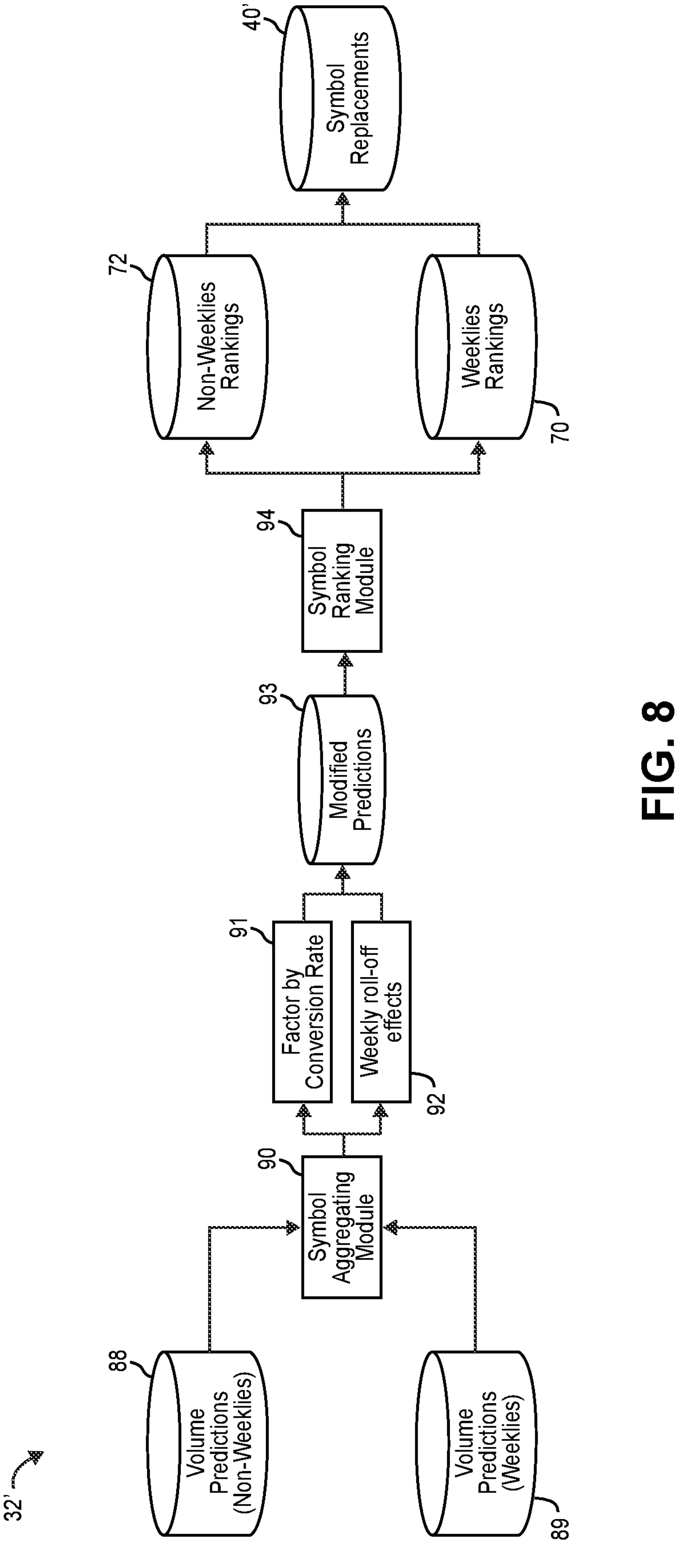
FIG. 8 is a diagram illustrating operation of an example control module for the system shown in FIG. 6 according to example embodiments.
Figure 9:
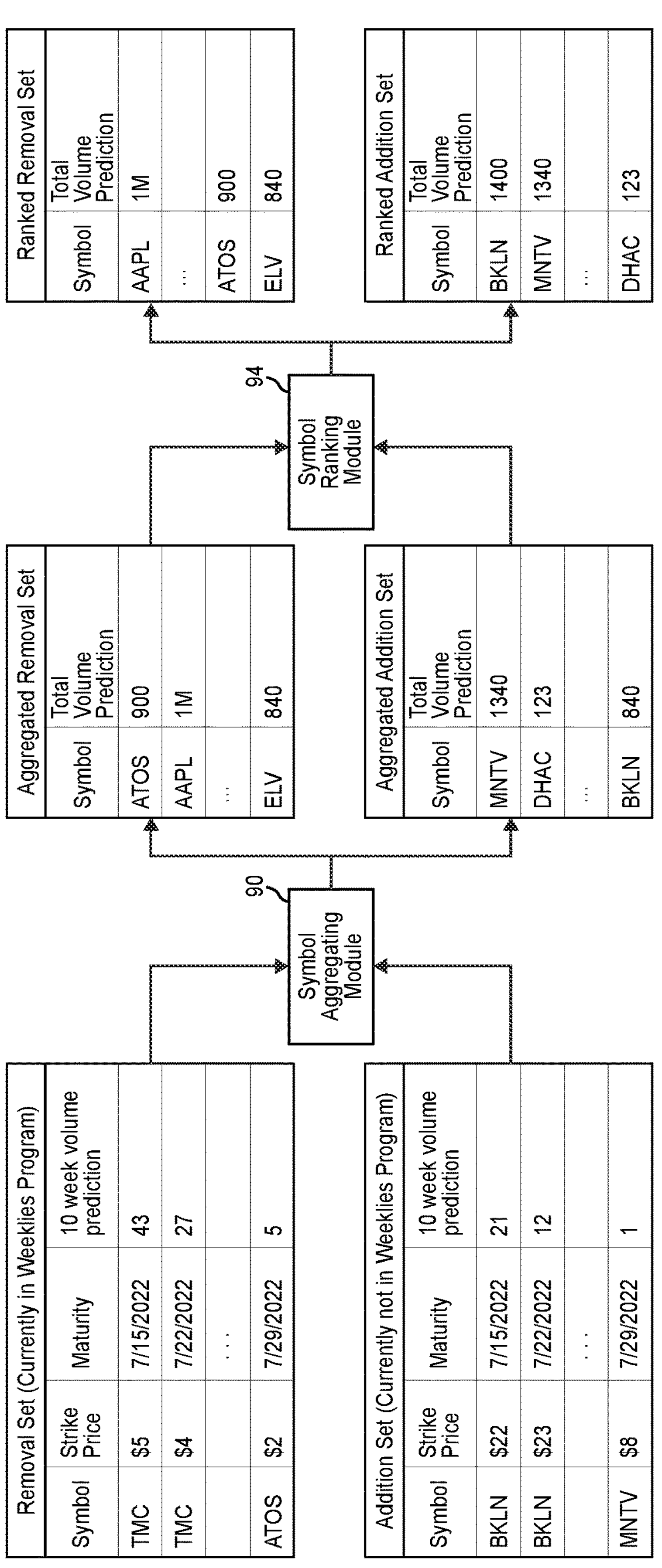
FIG. 9 is a diagram illustrating an example ranking various symbols based on respective volume predictions and for symbol addition and symbol removal (replacements) in the context of symbol volume prediction system shown in FIG. 6 according to example embodiments.
Figure 10:
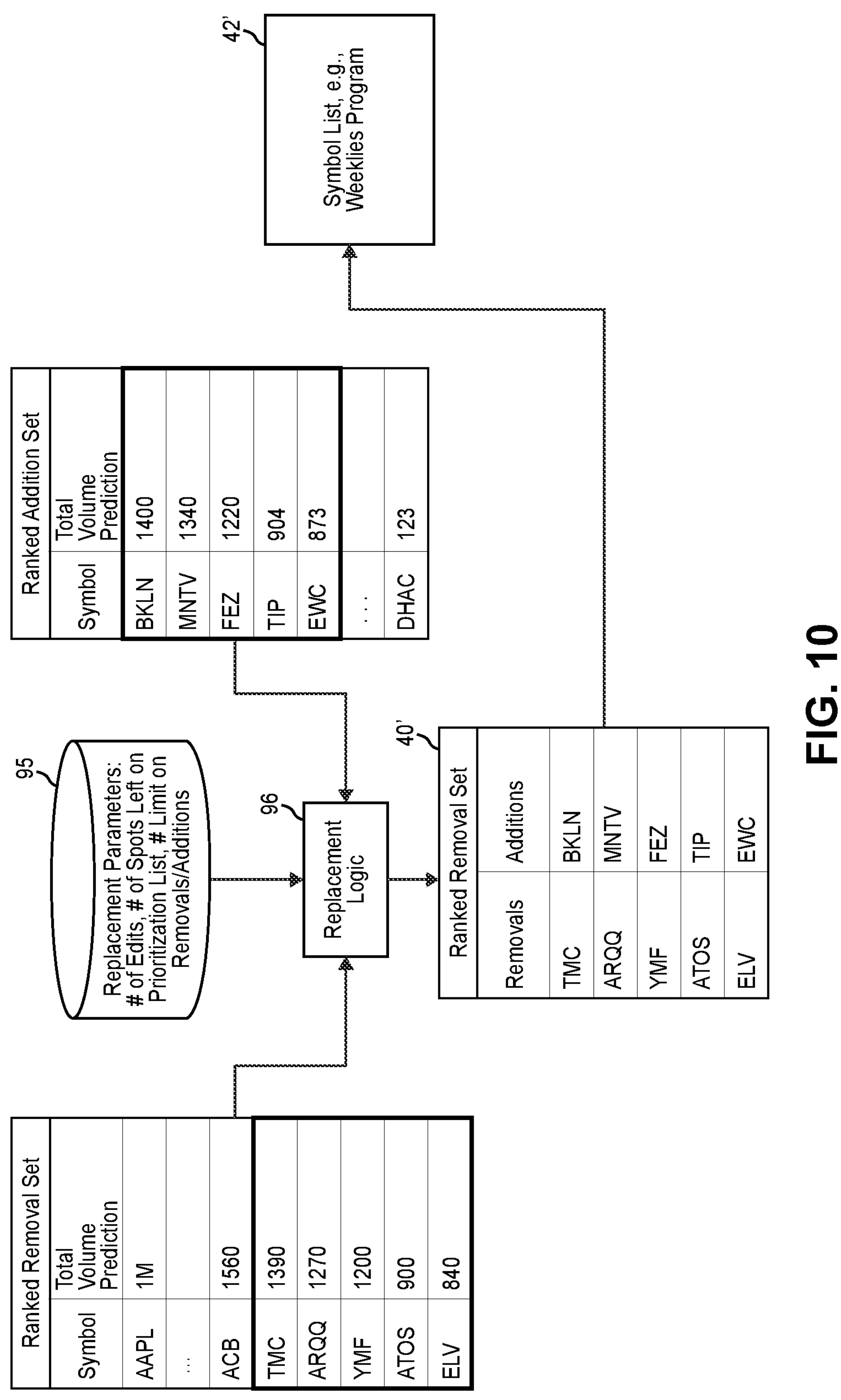
FIG. 10 is a diagram showing an example replacement logic/process for the example control system shown in FIG. 8 according to example embodiments.

The relationship between the figures is now briefly outlined in advance of their detailed description. FIG. 1 is an architecture diagram that shows components of the described computer system including one or more predictive machine learning (ML) models; FIG. 2 is an example of the computer architecture from FIG. 1 showing data communications between various computer and data storage entities for an application to data objects; FIG. 3 illustrates a method performed in the computer architecture of FIG. 2; FIG. 4 shows a specific example of the control module 32 in FIG. 2's computer architecture that implements step S5 in FIG. 3;

FIG. 5 shows a specific example of the monitoring module 34 in FIG. 2's computer architecture that implements step S6 in FIG. 3; FIG. 6 is an example of the computer architecture from FIG. 1 showing data communications between various computer and data storage entities for an example application to symbol data objects; FIG. 7 shows a specific example of the volume predictor module(s) 28' in FIG. 6's computer architecture that implements steps S2 and S3 in FIG. 3 for symbol objects; FIG. 8 shows a specific example of the control module 32' in FIG. 6's computer architecture that implements step S4 and S5 in FIG. 3 for symbol objects; FIG. 9 illustrates a ranking logic example of step S4 in FIG. 3 for symbol objects implemented using symbol ranking module 94 in FIG. 8; FIG. 10 illustrates a replacement logic example of step S5 in FIG. 3 for symbol objects implemented using replacement parameters 95 and replacement logic 96 in FIG. 10; FIG. 11 illustrates example monitoring system routines as an example implementation of monitoring step S6 in FIG. 3 implemented by monitoring module 34'; and FIG. 12 shows an example computing system that may be used to implement the features shown in and described throughout this document, including those features shown in and described with reference to FIG. 1 through FIG. 11.

Description of Computer System-FIG. 1

FIG. 1 is a computer system diagram according to certain example embodiments. In many places in this document, including the description of FIG. 1, computer-implemented function blocks, functions, and actions may be implemented using software modules. It should be understood that function blocks, functions, and/or actions performed by software module(s) or processing node(s) are actually implemented by underlying hardware (such as at least one hardware processor and at least one memory device) according to program instructions specified by the software module(s). The software modules referenced below may be separately defined or combined. Details of an example computer system with at least one hardware processor and at least one memory device are provided in the description of FIG. 12. In addition, the described function blocks, functions, and actions may also be implemented using various configurations of hardware (such as ASICs, PLAs, discrete logic circuits, etc.) alone or in combination with programmed computer(s).

The computer system 10 receives and processes data from one or more data sources 16 labeled as $S_1, S_2, \ldots, S_N$. In FIG. 1, one or more databases 18 labeled as $DB_1, DB_2, \ldots, DB_N$ can be additional data sources and/or may store input data from data sources 16. In certain examples, the data from the various data sources may be stored in a data warehouse or data lake (not shown) that may then be queried and operated on by computer architecture 12.

Ultimately, computer architecture 12 is configured to receive and process information from an arbitrary number of data sources. In certain instances, the data sources may include internal data sources (e.g., that are operated by the same organization that is operating computer architecture 12). Data sources may include data wire service providers (e.g., a data "wire" service similar in the way Reuters is a news service). In certain instances, the data sources may be subscribed to by computer architecture 12. The data sources and the data formats for those data sources may be heterogeneous or homogeneous in nature, and as such, any type of data format may be acceptable.

Input data stored in the databases 18 may include different types of data and may be in any form including in tabular form with columns or in some other organized form of elements or nodes. Input data may include multiple, indexed data values, e.g., temperature data might have a list of temperature values in centigrade. Examples input data in the context of machine learning (ML) models (e.g., neural networks) data analysis include features, engineered features, and derived features. Virtually any type of data may be received and analyzed.

One or more transceivers and/or interfaces 20 receive input data sets from the database(s) 18 along with one or more target metrics and a desired number of synthesized data sets to be generated and output by the computer architecture 12 for a user or for another computer system. One or more hardware processors 22 are shown as examples. It is understood that all of the functions of the computer system may be performed using a processing system having one or more hardware processors 22 in a centralized fashion and/or using one or more dedicated hardware processors dedicated to perform certain functions of the computer architecture 12.

Using programs and data stored in one or more memories 24, the processor(s) 22 execute a preprocessing module 26 which preprocesses input data sets into formatted data sets that are useable by predictive machine learning model(s) 30 described below. The memor(ies) 24 store a prediction module 28 with one or more predictive machine learning (ML) models 30, which when executed by the processor(s) 22, analyze the formatted data sets and generate predictions for a predetermined time period. In example embodiments, the predictions include a list of predicted object attribute values for data objects in the input data sets. The memor(ies) 24 store a control module 32, which when executed by the processor(s) 22, sorts the predictions, e.g., the list of predicted object attribute values, to generate ranked data objects, e.g., a current, ranked list of data objects with predicted data object attribute values. In example embodiments, the control module 32 preferably modifies a current ranking to account for a prior ranking of data objects (described below). The control module 32 replaces a subset of lower ranked data objects from the prior ranking of data objects with a subset of predicted, higher ranked data objects to generate a new ranking of data objects.

A monitoring module 34, which when executed by the processor(s) 22, calculates performance metrics for the new ranking of data objects relative to benchmark data for those data objects. Benchmark data is any standard or point of reference against which new ranking of data objects may be compared or assessed. One non-limiting example of benchmark data could be data objects actually selected during the predetermined time period. Another non-limiting example of benchmark data could be data objects determined to be the most relevant for the predetermined time period based on one or more relevance criterion(ia). A goal of the monitoring module 34 is to determine how well the new ranking of data objects met the objectives of the computer architecture 12 (or other objectives, depending on the application). For example, the objectives may include ensuring that the most relevant data objects in an application of the computer architecture 12 are prioritized. In this situation, the computer architecture 12 performs more optimally when it correctly predicts and prioritizes (includes in the new ranking) data objects that turn out to be the most relevant data objects in that application. In that situation, the allocation of computer system resources is optimized in contrast with expending computer system resources for less relevant data objects.

Accordingly, the monitoring module 34 adjusts, e.g., retrains, the one or more predictive machine learning models 30 based on test results and/or feedback from an application of the computer architecture 12 to improve model performance. This adjustment may be done multiple times via multiple iterations.

In certain example embodiments, the computer architecture 12 may be implemented in a cloud-based computer environment and may be implemented across one or more physical computer nodes (such as, for example, a computer node as shown in FIG. 12). In certain examples, different modules of the computer architecture 12 may be implemented on virtual machines implemented on corresponding physical computer hardware.

Further Description of Computer System—FIG. 2

FIG. 2 is an example of the computer architecture from FIG. 1 showing data communications between various computer and data storage entities for an application to data objects according to certain example embodiments.

Raw data, which include data objects and data object attributes, stored this example in one or more databases 18, is processed by the data preprocessing module 26 and formatted input data sets, which are stored in data objects memory 36, e.g., one or more databases. The prediction module 28 processes the formatted input data sets and generates prediction objects stored in prediction objects memory 38. The prediction objects are provided to the control module 32 which processes them with corresponding data objects from the data objects memory 36 to determine data object list(s) replacements 40 used to generate prioritized data object list(s) 42 stored, in this example, in a data objects results database 44.

A variety of different machine learning prediction models may be used by the prediction module 28 including, for example, a random forest model, a gradient boosted trees model, a support vector machine model, and penalized linear regression models. One of these example models, the gradient boosted trees model, is an ensemble method that takes a large number of "weak predictors" and aggregates each weak predictor's guess at the number of selections per data object to produce a final prediction. Weak predictors are typically simple models such as individual decision trees and linear models connected in series. Each tree tries to minimize the error/residual of the previous tree. The weak predictors are fit in such a way that each new predictor fits into the residuals of the previous step so as the model improves. The final model aggregates the result of each step to produce a strong predictor. A loss function is used to detect the residuals. For instance, mean squared error (MSE) can be used for a regression task and logarithmic loss (log loss) can be used for classification tasks. More complex methods may also be used such as time-series based approaches including recurrent neural networks like Long Short-Term Memory networks or causal neural networks like Temporal-Convolutional neural networks.

The monitoring module 34 and the prediction module 28 received the prioritized data object list(s) 42. The monitoring module 34 monitors results, outputs, and/or activities of a system be monitored by the monitoring module to determine benchmark data could be benchmark data for the data objects in the new ranking of data. Alternatively, benchmark data for the data objects in the new ranking of data objects may be calculated by and/or provided to the monitoring module 34. The monitoring module 34 calculates performance metrics for data objects in the new ranking of data objects relative to benchmark data for the data objects in the new ranking of data. The monitoring module 34 provides feedback information corresponding to or based on the performance metrics to the predictive machine learning model(s) in prediction module 28, along with information from the data objects results database 44, e.g., traded volumes since addition and removal from the weeklies list, to improve model performance, e.g., by comparing the traded volumes since addition and removal from the weeklies list to the predicted trading volumes to retrain the ML model.

Although separate memories 18, 36, 38, 40, 42, and 44 are shown for illustration and to facilitate understanding, a single memory, fewer memories, or some other memory arrangement may be used.

Description of Operation of the Computer Architecture—FIG. 3

FIG. 3 is a flowchart showing example computer-implemented procedures implemented by the computer architecture shown in FIG. 2 for an application to data objects according to certain example embodiments.

In step S1, the transceiver(s)/interface(s) 20 receive over the data communications network 14 different input data sets (raw data) from multiple sources 16 and 18 communicating with the data communications network 14. A data communications network is a set of nodes, including computers, terminals or other type of communication control units in various locations, connected by links including communication channels providing data paths between the nodes. The nodes may transmit and receive data packets, e.g., transporting input data sets and other data, on one or more of the communication channels using or following a data communications protocol often as a part of a protocol suite or stack like TCP/IP, IPX/SPX, X.25, AX.25, etc. Each input data set includes data objects, and each data object includes associated data object attributes. Also in step S1, the computer architecture 12 executes the preprocessing module to preprocess the input data to generate formatted input data sets that are suitable for processing by the ML prediction model(s) 30. In step S2, the computer architecture 12 executes the prediction module 28 to predict for a predetermined time period, using one or more predictive machine learning models 30, a list of predicted object attribute values for data objects in the input data sets.

In step S3, the computer architecture 12 executes the control module 32 to sort the list of predicted object attribute values to generate a current, ranked list of data objects with predicted data object attribute values. In example embodiments, the control module 32 generates two sets of predictions: an addition set for data objects that are not currently on a list of data objects and a removal set for data objects that are currently on a list of data objects. In step S4, the control module 32 aggregates predictions per data object and ranks the data objects for both the addition set and the removal set. In step S5, the control module 32 removes from the list of data objects at least some of the data objects included in the removal set and adds to the list at least some of the data objects included in the addition set based on the predictions, rankings, replacement logic (described below), and one or more replacement parameters (described below).

In step S6, the computer architecture 12 executes the monitoring module 34 to calculate performance metrics for data objects in the new ranking of data objects, e.g., relative to benchmark data for the data objects in the new ranking of data. In step S7, the monitoring module decides whether the prediction ML model(s) need retraining. If not, the procedure returns to step S1 to start with new input data. If so, the flow proceeds to step S8 where the monitoring module 34 generates information to adjust, e.g., retrain, the one or more predictive machine learning models 26 to improve performance, and after adjustment/retraining, control returns to step S2.

Regarding steps S7 and S8 in FIG. 3, the monitoring module 34 may determine metrics for evaluating the performance of the prediction module 28. For example, monitoring module 32 may determine a difference or error between the predictions and actual selections or results for each data object. If the difference or error exceeds a predetermined threshold, then the monitoring module 34 provides retraining information to the prediction module 28 to retrain one or more of the predictive machine learning models 30, which combines or uses that retraining information along with previously used model training data to generate new training data for further model training.

It is understood below that reference to one of the modules performing some action, operation, function, or the like, refers to the computer architecture 12 executing program instructions corresponding to the module to perform that action, operation, or function.

Description of an Example Application of the Computer System—FIG. 4

FIG. 4 shows a specific example of the control module 32 in FIG. 2's computer architecture 12 that implements step S5 in FIG. 3. Here, the prediction objects 38 are divided into predicted objects to be removed 38*a* from the prioritized data objects list(s) 42 and predicted objects to be added 38*b* to the prioritized data objects list(s) 42. In example embodiments, the control module 32 includes a prediction modification module 50 that modifies the predicted objects to compensate for effects of the predicted objects 38*a* being removed from the prioritized data objects list(s) 42 in terms of their relevance, future selection, and/or other criteria. The prediction modification module 50 may for example apply a correction factor to and/or account for roll off effects for a data object attribute of a predicted object 38*a* being removed from the prioritized data objects list(s) 42. A detailed explanation of example modifications is provided below in conjunction with FIGS. 8 and 11 below. The modified predictions are stored in memory 52 and processed by a data object ranking module 54, which prioritizes, e.g., ranks, the modified, predicted objects 38*a* being removed to generate a ranked list of data objects to be removed and stores them in removal rankings memory 56. The data object ranking module 54 similarly prioritizes, e.g., ranks, the modified, predicted objects 38*b* being added to generate a ranked list of data objects to be added and stores them in add rankings memory 58. The control module 32 stores prioritized list replacements in memory 40. Although separate memories 38*a*, 38*b*, 52, 56, 58, and 40 are shown for illustration and to facilitate understanding, a single memory, fewer memories, or some other memory arrangement may be used.

Description of an Example Application of the Computer System—FIG. 5

FIG. 5 shows a specific example of the monitoring module 34 in FIG. 2's computer architecture 12 that implements step S6 in FIG. 3. One or more raw data detection modules 60 provide detected data signals to a signal processing module 62 that processes them. In an example embodiment, the signal processing module 62 processes the detected data in accordance with the following function f:

$$f(x_t | c_{t-1-n:t-1}, s_{t-1-n:t-1}, a_{t-1-n:t-1}, P_{t-1-n:t-1}),$$

where c=cyclicality information, s=seasonality information, a=anomalous event information, and P=other parametrization around a data object, and n=a lookback window. This function measures performance and detects anomalies in a highly non-stationary environment by data storage.

For each data object and in the aggregate, the monitoring module 34 will process market signals such as trading volume and quote information along with already known information on each data object. The monitoring module 34 may look back up to "n" days of market signals. Estimation and/or calculation of performance or indicator metrics is performed using these market signals, preferably taking into account seasonality, cyclicality, and/or anomalous event information previously determined, directly embedded/hard coded to the signal processor, or implicitly embedded in a way it shapes what the function f looks like.

The signal processing results are stored in data storage 64 and can be provided to a user via a user interface 68. The results are also provided to a performance tracking module 66 and an anomaly detection module 67. The performance tracking module 66 evaluates the signal processing results and determines performance metric(s) for data objects in the ranking of data objects relative to benchmark data for those data objects. The performance metric(s) for data objects are stored in the data storage 64 and provided to a user for consideration via the user interface 68. Although not shown here, the performance metric(s) for data objects is used to determine whether to retrain the ML prediction model(s) (e.g., the model's prediction performance for a set of monitored data objects is less than a desired threshold as compared to the actual performance of data objects). See steps S7 and S8 in FIG. 3. Outputs from the anomaly detection module 67 may also be used to affect the model retraining, e.g., if the anomaly detection module 67 shows that the error between the predicted values and the realized values is increasing over time, it could trigger retraining to recalibrate the model.

The anomaly detection module 67 evaluates the signal processing results for possible anomalies that may skew the processing results in a way that may be undesirable. This may include, but is not limited to, worsening performance by the model over time, systemic bias towards certain groups or populations by the model, or patterns in the results that violate the assumptions of the chosen machine learning model. A user may be alerted via the user interface 68 when an anomaly is detected.

Other examples of relevance may relate to a dynamic environment where one or more features in the environment are frequently changing and it is important to monitor and identify those features that are likely to be important in the future and those that are likely to be less important at that time. For example: airplane wait times are relevant (in the case of an air traffic control application), covid cases/deaths in particular communities are relevant (in the vaccine/ventilator application), smart power grids where various sources of electricity and total output changes depending on weather conditions, raw material supply chain conditions, etc. In the power example, changes in the primary source of electricity need to be monitored and serviced as well as monitoring in other sources of electricity that are not being used as currently but will likely change in the future.

The performance metric(s) for data objects and/or anomaly detection information may also be used to update replacement parameters (example replacement parameters are shown in block 95 in FIG. 10 described below) as operational environment changes. See steps S9 and S10 in FIG. 3.

Description of an Example Application of the Computer System—FIG. 6

There are many specific applications that can benefit from the computer architecture 12 in FIG. 2 relating to data objects. For example, in a retail shelf space optimization application, each data object may correspond to a class of groceries such as beverages, cereals, personal care, etc., and each data object may have data attributes which correspond to specific offerings for that data object such as Special K™, Cheerios™, Honeycomb™, etc. in a cereal category.

One detailed application is now described for non-limiting illustration purposes. FIG. 6 shows an example application involving options listings on an electronic trading platform. A typical electronic trading platform can be configured to allow trading of many different items; as used here, when an item is described as "listed" for trading on an electronic trading platform, that means that the electronic trading platform is configured such that trading of that item can take place on the electronic trading platform. The computer architecture in FIG. 6 may be separate from, but in communication with, the electronic trading platform, or the computer architecture may be a part of the electronic trading platform.

In this example options listing application, each data object corresponds with an underlying asset such as a stock, an exchange-traded product (ETP), a bond, a currency, a commodity, etc. An option is a contract giving a buyer the right, but not the obligation, to buy (in the case of a call) or sell (in the case of a put) a certain amount of the underlying asset at a specific price on or before a certain date. Options contracts (also referred to simply as "options" or as "contracts") are classified as derivatives because they derive their value from their underlying asset. In this example options listing application, each possible symbol along with its associated set of options contract offerings comprises a data object. Each options contract associated with a symbol is a data attribute of that data object. Each contract includes an expiration data and a strike price which is the set price at which an option can be bought or sold when it is exercised, and an amount or quantity of the underlying asset. For call options, the strike price is where the underlying asset can be bought by the option holder. For put options, the strike price is the price at which the underlying asset can be sold. The number of option listings for a particular symbol (data objects) that are actually bought or sold (traded) is referred to as the option trading volume for that symbol over a predetermined time period. This is a non-limiting example of benchmark data.

It is possible to have thousands of option contracts for each underlying asset, with each option contract either being a put or a call and having a different strike price, a different quantity, and/or a different expiration date. As just one example, it is possible to have thousands of different option contracts that have Apple stock as their underlying asset. For many electronic trading platforms on which options contracts are traded, the platforms are expected to handle all options contracts for thousands of underlying assets—in some instances, as many as ten thousand underlying assets, or more. Accordingly, the number of possible options contracts that correspond to ten thousand underlying assets is massive. To list that massive number of possible options contracts on an electronic trading platform requires massive computer system resources on the electronic trading platform including data communications bandwidth, memory storage, data processing capacity, computational speed, and power consumption.

But not all possible listings are relevant in terms of their likelihood of being traded. In fact, a significant percentage of possible listings do not have any trading volume and another significant percentage of possible listings only have a relatively small trading volume. The computer architecture shown in FIG. 6 reliably and accurately predicts which smaller subset of option contract listings are likely to be of significant interest to end users to trade, and it also adapts to rapidly changes in the options trading environment. As a result, computer system resources are allocated to list the smaller subset of options that have the largest trading volumes.

Monthly options expire on the third Friday of the expiration month, while weekly options expire on each of the other Fridays in a month (with adjustments for holidays). Thus, symbols with weeklies have many more short dated options available. "Monthlies" have 12 monthly expirations per year on the third Friday of each month, and "weeklies" have 52 expirations per year, thereby offering many more trading opportunities for weeklies. In addition, during three out of four weeks, the weeklies offer the ability to make a very short-term bet, e.g., based on a particular news item or anticipated sudden price movement. Symbols that are moved to the weekly options program tend to receive an increase in trades proportional to the volume on trades that that symbol was already generating. Thus, it is desirable to move symbols with the highest expected volume to the weeklies to gain the biggest increase in new trades.

FIG. 6 is similar to FIG. 2 (note that similar entities in FIG. 6 are indicated with the same reference number but with a prime, e.g., 18') and operates in accordance with the procedures described in FIG. 3 with the following additional details. Symbol data objects are stored in memory 36'. A symbol data object corresponds to a symbol of the underlying asset, and each symbol data attribute correspond to an option contract ("contract") for that underlying asset. The data preprocessing module 26' processes raw data 18' by for example grouping, cleaning, and selecting input for option contracts and actual option contract trades and aggregating (e.g., summing) amounts or volumes for each ticker symbol at a particular price, for a particular date. The preprocessed data is in a format useable by the volume prediction module 28' and predictive ML model(s) 30. The volume prediction module 28' predicts using machine learning model(s) the volume of options trading activity for each symbol for a future time period and stores those predicted volumes for each symbol in memory 38'. The control module 32' processes and aggregates the predicted volumes for each symbol and ranks those symbols currently on the "weeklies" listing based on predicted volume in a weeklies ranked memory 70 and ranks those symbols currently not on the "weeklies" listing based on their respective predicted volumes in a non-weeklies ranked memory 72. The control module 32' uses those rankings to identify which symbols in the symbol list 42', e.g., the weeklies options listing, having lower predicted trading volumes should be replaced with non-weeklies symbols predicted to have higher trading volumes for the future time period. The symbol replacements in memory 40' update the symbol list 42', and the symbol trade volume results memory 44' stores, for example, the amount of trading volume received in the future time period for the additions to the weeklies options listing and the amount of trading volume lost in the future time period for the removals from the weeklies options listing. Actual trading volume for each symbol is determined and stored by monitoring module 34', with the monitored feedback being provided to the volume predictor module 28' for possible ML model adjustment via metrics on model bias, performance, and adherence to the model's assumptions.

Description of an Example Volume Predictor Module—FIG. 7

FIG. 7 shows a specific example of the volume predictor module 28' in FIG. 6's computer architecture that implements steps S2 and S3 in FIG. 3 for symbol data objects. Preprocessed trade data including option listings for many different trading symbols stored in memory 74 is parsed in block 76 into current editable weeklies (symbols currently included in the weeklies listing), editable non-weeklies (symbols currently not included in the weeklies listing), and immutable or non-editable symbols (symbols that are not currently allowed to be added or removed from the weeklies program). The immutable symbols that have been added to or removed from the weeklies list are stored in memory 78 to avoid addition/removal suggestions on these symbols. The current editable weeklies are stored in memory 80, and the current editable non-weeklies are stored in memory 82. Memories 78, 80, and 82 may also be stored as separate lists in one memory.

Block 84 aggregates the option contracts identified for each symbol data object in the non-weeklies list 80 to generate an aggregated weeklies list stored at 85, and aggregates the option contracts identified for each symbol data object in the weeklies list 82 to generate an aggregated weeklies list stored at 86. Block 87 corresponds to processing the aggregated weeklies and aggregated non-weeklies data to predict using one or more machine learning prediction models, a predicted trading volume for a future time period per symbol data object, and stores the volume predictions for non-weeklies in memory 88 and for weeklies in memory 89. Example machine learning prediction models were described above.

Description of an Example Control Module—FIG. 8

FIG. 8 shows a specific example of the control module 32' in FIG. 6's computer architecture that implements step S4 and S5 in FIG. 3 for symbol objects.

A symbol aggregating module 90 retrieves the individual option volume predictions for non-weeklies from memory 88 and for weeklies from memory 89, which often include many different option contracts for the same symbol for a predetermined time period, e.g., ten weeks, and combines them into total option trade volume predictions for each of the symbol data objects for that time period. In example embodiments, at least some of the total option trade volume predictions per symbol may be modified to account for lost volume for a symbol because new options may still be listed on the weeklies program on any expiration dates that a symbol had prior to its removal from the weeklies program (may be referred to simply as "weeklies"). As mentioned above, symbols that are only listed on the monthlies program have fewer trading opportunities than symbols listed on the weeklies program, and as a result, usually have lower trading volumes than symbols in the weeklies program.

Two example volume prediction modifications are shown in FIG. 8 including a modification module 91 that applies a conversion rate factor to the symbol volumes removed from the weeklies symbol list and a modification module 92 that compensates for weekly roll-off effects experienced when a symbol is removed from the weeklies symbol list.

Consider the following conversion rate factor modification example where there are five non-weeklies symbols to be added to the weeklies list (symbols NEOG, EWG, NU, TIP, AND SPXS) and five weeklies symbols to be removed from the weeklies list (symbols ATOS, TMC, YPF, OPK, AND ARQQ). Table 1 below shows example total trade volume, number of trades, number of unique traders, predicted trade volume, conversion rate, and adjusted predicted volume for each of the symbols in this example.

TABLE 1

| Symbol | Total Trade Volume | Number of Trades | Number of Unique Traders | Predicted Trade Volume | Conversion Rate | Adjusted Prediction |
|---|---|---|---|---|---|---|
| Non-Weeklies to be Added to Weeklies | | | | | | |
| NEOG | 1910473 | 51009 | 15921 | 4460785 | 1.8 | 8029413 |
| EWG | 2702792 | 54056 | 2755 | 2768610 | 1.8 | 4983498 |
| NU | 1524889 | 17134 | 1240 | 2246836 | 1.8 | 4044305 |
| TIP | 5283805 | 9021 | 2103 | 2163974 | 1.8 | 3895153 |
| SPXS | 782891 | 26096 | 18797 | 1366933 | 1.8 | 2460479 |
| Weeklies to be Removed From Weeklies | | | | | | |
| ATOS | 16286 | 543 | 281 | 31176 | 1 | 31176 |
| TMC | 11040 | 1601 | 1577 | 29863 | 1 | 29863 |
| YPF | 14679 | 571 | 459 | 26783 | 1 | 26783 |
| OPK | 15361 | 808 | 205 | 24368 | 1 | 24368 |
| ARQQ | 21611 | 218 | 180 | 6242 | 1 | 6242 |

The total trade volume, number of trades, number of unique traders, predicted trade volume for the five highest ranked non-weeklies symbols to be added to the weeklies program significantly exceeds the total trade volume for the five lowest ranked weeklies symbols to be removed from the weeklies program. However, the predicted volume for the five highest ranked non-weeklies symbols to be added to the weeklies program is multiplied by a conversion factor, which in this example is 1.8, nearly doubling the predicted volumes as shown in the rightmost column. The conversion factor for the five lowest ranked weeklies symbols to be removed from the weeklies program in this example is 1.0, so the adjusted predicted volume is the same. The conversion factor of 1.8 (greater than one) for the symbols to be added to the weeklies program corresponds to the likelihood that symbols added to the weeklies program are very likely to have higher trading volume as compared to when the added symbols were on the weeklies program due to having more strikes listed than before.

Another type of predicted volume modification or correction is referred to as "roll-off." A "roll off" modification example for predicted option volume for symbol ATOS shown in Table 2.

TABLE 2

| Week Number | Replacement Modification for the option | | | | |
|---|---|---|---|---|---|
| | 1 week options | 2 week options | 3 week options | 4 week options | 5 week options |
| Date: Jan. 1, 2023 | | | | | |
| 1 week options | 1 | | | | |
| 2 week options | 0.76 | 1 | | | |
| 3 week options | 0.41 | 0.76 | 1 | | |
| 4 week options | 0.08 | 0.31 | 0.78 | 1 | |
| 5 week options | 0.02 | 0.23 | 0.61 | 0.92 | 1 |
| Date: Jan. 8, 2023 | | | | | |
| 1 week options | 1 | | | | |
| 2 week options | 0.76 | 1 | | | |
| 3 week options | 0.41 | 0.76 | 1 | | |
| 4 week options | 0.08 | 0.31 | 0.78 | 1 | |
| 5 week options | 0.02 | 0.23 | 0.61 | 0.92 | NA |
| Date: Jan. 15, 2023 | | | | | |
| 1 week options | 1 | | | | |
| 2 week options | 0.76 | 1 | | | |
| 3 week options | 0.41 | 0.76 | 1 | | |
| 4 week options | 0.08 | 0.31 | 0.78 | NA | |
| 5 week options | 0.02 | 0.23 | 0.61 | NA | NA |
| Date: Jan. 22, 2023 | | | | | |
| 1 week options | 1 | | | | |
| 2 week options | 0.76 | 1 | | | |
| 3 week options | 0.41 | 0.76 | NA | | |
| 4 week options | 0.08 | 0.31 | NA | NA | |
| 5 week options | 0.02 | 0.23 | NA | NA | NA |

Symbol ATOS, listed in Table 1, is one of the five lowest ranked weeklies symbols that will be removed from the weeklies program. Table 2 assumes that ATOS is removed from the weeklies program on 1/1/2023. The first section of Table 2 for 1/1/2023 shows the expiration dates for ATOS options available the day of and their substitutes. A substitute is an expiration for a symbol option that a trader might trade if the expiration for a symbol option that the trader wanted to purchase is now unavailable. Note that NA indicates that an expiration date is no longer available. For week 1, all expirations are available. The next week, 1/8/2023, five week options for ATOS can no longer be listed on the weeklies because of the removal all ATOS removed. That means that some trading volume on five week options for ATOS are lost. Because four week options for ATOS can be suitable substitutes 92% of the time, it is assumed that 92% of that volume on week five options move to week four options, so that 8% of the ATOS option trading volume is lost.

At week 1/15/2023, ATOS can no longer be listed four or five weeks out resulting in lost volume for trades that would have occurred on the week four and five options for ATOS. Because four-week options for ATOS no longer exist, the best substitute for a five-week option for ATOS is a three week option for ATOS which nets 61% of the five week trading volume, and 39% of the ATOS option trading volume attributable to five week options is lost. Similarly, four week options can be substituted with three week options for ATOS 78% of the time, which means 22% of the ATOS option trading volume attributable to four week options is lost. This pattern continues for the following three weeks dated Jan. 22, 2023, 1/29/2023, and 2/05/2023. By the week 2/05/2023 100% of the ATOS option trading volume attributable to ATOS being included in the weeklies program is lost. This roll over accounting helps determine how much ATOS trading volume is actually lost and how much ATOS trading volume is moved to another ATOS option series.

The two examples for modifying predictions, the conversion rate and roll-off modifications, enhance the accuracy of the prediction. Both, only one, or some other prediction modification may be used. The modified symbol volume predictions 93 are ranked in symbol ranking module 94 to generate the weeklies rankings 70 and non-weeklies rankings 72 from which the symbol replacements 40' are determined. Table 1 above provided an example of removing the five symbols on the weeklies program with the lowest ranked, modified predicted volume for the next five weeks, and adding in their place the five symbols not in the weeklies program with the highest ranked, modified predicted volume for the next five weeks.

Description of a Ranking Logic Example—FIG. 9

FIG. 9 illustrates a ranking logic example of step S4 in FIG. 3 for symbol objects implemented using the symbol aggregating module 90 and the symbol ranking module 94 shown in FIG. 8. A removal set for symbol objects (TMC . . . ATOS) currently in the weeklies listing or program and an addition set for symbol objects (BKLN . . . MNTV) not in the weeklies listing or program are aggregated by the symbol aggregating module 90 to generate total predicted volume for each symbol for the 10 weeks to generate the aggregated removal set and the aggregated addition set. The symbol ranking module 94 then ranks each of the lists by total volume prediction from highest to lowest predicted volume to generate a ranked removal set of multiple symbols (AAPL, . . . ATOS, ELV) to be removed from the weeklies and a ranked addition set (BKLN, . . . MNTV, DHAC) to be added to the weeklies. In example embodiments, only some subset of each ranking set will be identified for replacement as described in the example of FIG. 10.

Description of a Replacement Logic Example—FIG. 10

FIG. 10 illustrates a symbol object replacement logic example of step S5 in FIG. 3 implemented using example replacement parameters 95 and example replacement logic 96. The replacement logic 96 uses one or more replacement parameters 95 to determine the replacement protocol followed. Example replacement parameters include a number of edits allowed to be made in a period (e.g., 10 edits permits for example make 5 additions and 5 removals or 1 addition and 9 removals), a number of positions remaining on the prioritization (weeklies) list, a limit on the number of removals and on the number of additions. Other suitable replacement parameters may be used.

Based on the replacement parameters 95, replacement logic 96 identifies the five lowest ranked symbols in the ranked removal set of multiple symbols, e.g., the current weeklies program, including TMC, ARQQ, YMF, ATOS, AND ELV, which have the lowest predicted total trading volumes in that set. Similarly, based on the replacement parameters 95, replacement logic 96 identifies the five highest ranked symbols in the ranked addition set of multiple symbols, e.g., the list of symbols not in the weeklies program, including BKLN, MNTV, FEZ, TIP, AND EWC, which have the highest predicted total trading volumes in that set. The replacement logic 96 generates a ranked removal set of replacements, i.e., TMC is removed and BKLN is added and so on, which is then used to update the symbol list 42' for the predetermined time period.

Description of Example Monitoring System Routines-FIG. 11

FIG. 11 illustrates example monitoring system routines as an example implementation of monitoring step S6 in FIG. 3 implemented by monitoring module 34'. The monitoring module 34' performs three sets of signal processing operations. The first signal processing operation labeled as (1*a*) includes raw data detection module(s) 60 obtaining raw market data, signal processing module 62 processing raw market data, past weeklies data, and current weeklies data and converting it into a format useable by the performance tracking module 66 and anomaly detection module 67 for metric calculations in the second signal processing operations labeled at (2*a*) and (2*b*). The first signal processing operation (1*b*) also processes raw market data, past weeklies data, and current weeklies data to detect anomalies or errors in the input data, which when detected, can be communicated to a user via a user interface and/or stored.

The second set of signal processing operations at (2*a*) calculates volume gain predictions using actual volume generated on added weeklies, an estimation for how much of that added volume on the weeklies was actually taken from monthly options already listed, and estimated volume lost from removal of weeklies based on volume remaining on the monthlies for removed symbols. From the volume gain predictions, the signal processing determines a lower bound net volume gain estimate and an upper bound net volume gain estimate, which are stored and also may be provided to a user via a user interface. In addition, the lower bound net volume gain estimate and an upper bound net volume gain estimate may be used to apply time series analysis techniques for better estimation.

The actual weeklies volume for the added symbols and the estimated weeklies volume for the removed symbols (based on their volume on monthlies) is used to calculate a volume percentile estimate of where that symbol would rank among all other weeklies (2*b*). The third set of signal processing operations (3) uses the estimated volume added and volume gained to estimate a confidence interval for net new volume (added–removed). The percentiles among other weeklies is a diagnostic tool.

The monitoring module 34' uses these performance metrics to determine if it is necessary to retrain the one or more predictive machine learning models 26 to improve their performances and/or update the replacement parameter(s). Regarding steps S7 and S8 in FIG. 3, the monitoring module 34' may determine metrics for evaluating the performance of the volume prediction module 28'. For example, the monitoring module 34' determines a difference or error between predicted and actual trading volume for each group of option contracts. If the difference or error exceeds a predetermined threshold, then the monitoring module 34 provides retraining information to the prediction module 28' to retrain one or more of the predictive machine learning model(s), which combines or uses that retraining information along with previously used model training data to generate new training data for further training of the model(s). As another example, the monitoring module 34' determines metrics that evaluate the performance of the control module 32'. Example performance metrics for the above example application might include an electronic trading platform's trade conversion rate (rate of increase in expected trades when adding a symbol onto the weeklies program) and the electronic trading platform's market share (% of trades in a particular option market actually traded on the electronic trading platform). If the performance metrics show that the control module 32' is not performing as expected or desired, then the monitoring module 34' provides input to the user that the control module 32' may need to be updated.

Description of an Example Computing System—FIG. 12

FIG. 12 shows an example computing system that may be used in some embodiments to implement features described herein. An example computing device 500 (which may also be referred to, for example, as a "computing device," "computer system," or "computing system") includes one or more of the following: one or more hardware processors 502; one or more memory devices 504; one or more network interface devices 506; one or more display interfaces 508; and one or more user input adapters 510. Additionally, in some embodiments, the computing device 500 is connected to or includes a display device 512. As will explained below, these elements (e.g., the hardware processors 502, memory devices 504, network interface devices 506, display interfaces 508, user input adapters 510, display device 512) are hardware devices (for example, electronic circuits or combinations of circuits) that are configured to perform various different functions for the computing device 500.

In some embodiments, each or any of the hardware processors 502 is or includes, for example, a single-core or multi-core hardware processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 502 uses an instruction set architecture such as x86 or Advanced RISC Machine (Arm).

In some embodiments, each or any of the memory devices 504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 502). Memory devices 504 are examples of non-volatile computer-readable storage media.

In some embodiments, each or any of the network interface devices 506 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 508 is or includes one or more circuits that receive data from the hardware processors 502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 512, which displays the image data. Alternatively or additionally, in some embodiments, each or any of the display interfaces 508 is or includes, for example, a video card, video adapter, or graphics processing unit (GPU).

In some embodiments, each or any of the user input adapters 510 is or includes one or more circuits that receive and process user input data from one or more user input devices (not shown in FIG. 12) that are included in, attached to, or otherwise in communication with the computing device 500, and that output data based on the received input data to the hardware processors 502. Alternatively or additionally, in some embodiments each or any of the user input adapters 510 is or includes, for example, a PS/2 interface, a USB interface, a touchscreen controller, or the like; and/or the user input adapters 510 facilitates input from user input devices (not shown in FIG. 12) such as, for example, a keyboard, mouse, trackpad, touchscreen, etc.

In some embodiments, the display device 512 may be a Liquid Crystal Display (LCD) display, Light Emitting Diode (LED) display, or other type of display device. In embodiments where the display device 512 is a component of the computing device 500 (e.g., the computing device and the display device are included in a unified housing), the display device 512 may be a touchscreen display or non-touchscreen display. In embodiments where the display device 512 is connected to the computing device 500 (e.g., is external to the computing device 500 and communicates with the computing device 500 via a wire and/or via wireless communication technology), the display device 512 is, for example, an external monitor, projector, television, display screen, etc.

In various embodiments, the computing device 500 includes one, or two, or three, four, or more of each or any of the above-mentioned elements (e.g., the hardware processors 502, memory devices 504, network interface devices 506, display interfaces 508, and user input adapters 510). Alternatively or additionally, in some embodiments, the computing device 500 includes one or more of: a processing system that includes the hardware processors 502; a memory or storage system that includes the memory devices 504; and a network interface system that includes the network interface devices 506.

The computing device 500 may be arranged, in various embodiments, in many different ways. In various embodiments, the computing device 500 includes one, or two, or three, four, or more of each or any of the above-mentioned elements (e.g., the processors 502, memory devices 504, network interface devices 506, display interfaces 508, and user input adapters 510). Alternatively, or additionally, in some embodiments, the computing device 500 includes one or more of: a processing system that includes the processors 502; a memory or storage system that includes the memory devices 504; and a network interface system that includes the network interface devices 506. Alternatively, or additionally, in some embodiments, the computing device 500 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 502 and the network interface devices 506; or the single SoC (or the multiple SoCs) may include the processors 502, the network interface devices 506, and the memory devices 504; and so on. Further, the computing device 500 may be arranged in some embodiments such that: the processors 502 include a multi-(or single)-core processor; the network interface devices 506 include a first short-range network interface device (which implements, for example, WiFi, Bluetooth, NFC, etc.) and a second long-range network interface device that implements one or more cellular communication technologies (e.g., 3G, 4G LTE, CDMA, etc.); and the memory devices 504 include a RAM and a flash memory. As another example, the computing device 500 may be arranged in some embodiments such that: the processors 502 include two, three, four, five, or more multi-core processors; the network interface devices 506 include a first network interface device that implements Ethernet and a second network interface device that implements WiFi and/or Bluetooth; and the memory devices 504 include a RAM and a flash memory or hard disk.

As previously noted, whenever it is described in this document that a software module or software process performs an action, operation, or function, the action, operation, or function is in actuality performed by underlying hardware elements according to the instructions that comprise the software module. Consistent with the foregoing, in various embodiments, each or any combination of the computer architecture 12, the memory devices 504 could load program instructions for the functionality of the preprocessing module 26, 26', the prediction module 28, 28', the predictive ML model(s) 30, the control module 32, 32', the monitoring module 34, 34', the prediction modification module 50, the data object ranking module 54, the raw data detection module(s) 60, the signal processing module 62, the performance tracking module 66, the anomaly detection module 67, function blocks 76, 84, 87 in FIG. 7, the symbol aggregating module 90, the symbol ranking module 94, and the replacement module 95, each of which will be referred to individually for clarity as a “component” for the remainder of this paragraph, are implemented using an example of the computing device 500 of FIG. 12. In such embodiments, the following applies for each component: (a) the elements of the 500 computing device 500 shown in FIG. 12 (i.e., the one or more hardware processors 502, one or more memory devices 504, one or more network interface devices 506, one or more display interfaces 508, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 504 (e.g., in various embodiments, in a volatile memory device such as a RAM or an instruction register and/or in a non-volatile memory device such as a flash memory or hard disk) and all actions described herein as performed by the software modules are performed by the processors 502 in conjunction with, as appropriate, the other elements in and/or connected to the computing device 500 (i.e., the network interface devices 506, display interfaces 508, user input adapters 510, and/or display device 512); (c) alternatively or additionally, to the extent it is described herein that the component processes and/or otherwise handles data, in some embodiments, such data is stored in the memory devices 504 (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing device 500 (i.e., the network interface devices 506, display interfaces 508, user input adapters 510, and/or display device 512); (d) alternatively or additionally, in some embodiments, the memory devices 502 store instructions that, when executed by the processors 502, cause the processors 502 to perform, in conjunction with, as appropriate, the other elements in and/or connected to the computing device 500 (i.e., the memory devices 504, network interface devices 506, display interfaces 508, user input adapters 510, and/or display device 512), each or any combination of actions described herein as performed by the component and/or by any software modules described herein as included within the component.

Consistent with the techniques described herein, as one example, in an embodiment where an instance of the computing device 500 is used to implement the computer architecture 12, the memory devices 504 could load program instructions for the functionality of the modules, model(s), and function blocks described above.

The hardware configurations shown in FIG. 12 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 12, (e) via other hardware arrangements, architectures, and configurations, and/or via combinations of the technology described in (a) through (e).

Technical Advantages of Described Subject Matter

The technological improvements offered by the technology described in this application can be applied in different domains, such as for example electronic trading platforms, retail shelf space management, data packet routing over networks, airline fleet scheduling, cargo space optimization for containers optimization, etc. The technology may be applied to any domain that requires resource allocation.

As explained in the detailed examples described above, the technology may be applied in one or more domains to analyze very large amounts of data continuously, for an otherwise intractable amount of different data objects and data sets, and narrow those large amounts to identify a subset of those data objects that are worth the computer processing and data communication resources required to generate relevant and useful data, e.g., that have a high probability of being of significant interest to end users. That narrowing is achieved by predicting, using one or more predictive machine learning models, a probability of execution of each of the data transaction objects at a future execution time, where the probability of execution for the at least one of the data transaction objects includes a probability satisfying the one or more conditions associated with the one of the data transaction objects.

Narrowing is further achieved by sorting the set of data objects based on the predicted data object attribute values to generate a current, ranked list of data objects with predicted data object attribute values, and modifying the current, ranked list of data objects to account for a prior ranking of data objects to generate a modified, ranked list of data objects with predicted data object attribute values. By replacing a subset of lower ranked data objects from the prior ranking of data objects with a subset of higher ranked data objects from the modified, ranked list of data objects with predicted data object attribute values, a new ranking of data objects is generated that not only a smaller subset of data but also much more likely to be a relevant subset of data.

How relevant the newly ranked data objects actually turn out to be is determined by calculating one or more performance metrics for data objects in the new ranking of data objects relative to benchmark data for the data objects in the new ranking of data.

Another advantage is the volume of information to be transmitted over the data communications network can be substantially reduced because communications can be focused on the data transaction objects indicated to have a higher probability of execution in the future. Less data to be communicated, stored, and processed means less data needs to be communicated over data communication networks by the computer system to end users. It also means there is lower consumption of other computer system resources like memory, storage capacity, and data processing capacity. That results in another benefit— improved performance of the computer system including faster processing speed, faster data communication speed, lower power consumption, and the like.

Processing a vast amount of input data sets is made much more efficient by using a predictive machine learning model to intelligently predict for a predetermined time period a list of predicted values for the data symbols because the predictive ML model not only can handle large amounts of data but also "learns," based on feedback and adaptation of the model, which data symbols are likely to be more relevant and useful for a predetermined future time period and which are less likely to be for that time period. The predictive ML model predictions for data objects are further enhanced by sorting (e.g., ranking) data object based on the predictions and also modifying the predictions for the data objects to account for prior sorting or ranking results that may not be well represented in the predictive ML model. Such modifications enhance the accuracy and relevance of the predictions. Each of the ML modeling and the modifications intelligently reduce and filter large amounts of data to a particularly relevant subset of data objects for which computer and data communications resources are advantageously allocated.

The monitoring described above provides additional technical advantages in that the computer system functions well in and adapts to a rapidly changing environment where data objects and usefulness and/or relevance criteria all change quite rapidly. The computer system monitors and identifies such changes and adapts the computer system, e.g., by training and retraining the predictive machine learning models and/or the modification parameters based on feedback that detects those changes, to rapidly and accurately respond and adapt to the changes. The predictive machine learning model can then be retrained as needed based on the one or more performance metrics to improve performance of the predictive machine learning model.

Adjusting (e.g., by retraining) the one or more predictive machine learning models and modification parameters based on the performance metrics generating from the monitoring also allows for a high level of customization through the use of objectives, constraints, and penalties.

Another technical advantage is the computer system 12 is highly compatible with standard product development frameworks (such as Agile).

Another technical advantage is that the computer system 12 is easily maintained because it is highly modularized, e.g., the prediction module, the control module, and the monitoring module. As a result, there is no need to understand the entire computer architecture 12 or an application of the computer architecture 12 to maintain and/or enhance part(s) of the system.

The technology also works well in any game theory settings where a list determines how a player competes and performs with other players. Predicting relevance, interest, and/or value of data objects is advantageous in any situation where a list of relevant, interesting, and/or valuable objects is maintained but also changes so that less relevant, interesting, and/or valuable data objects need not be monitored.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-12, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system to optimize, using machine learning and predictive control, allocation of computer and data communication resources for listing option contracts on an electronic trading platform, comprising:

a transceiver configured to receive over a data communications network different input data sets from one or more trading source computers communicating with the data communications network, where an input data set includes trading symbol data objects, each trading symbol data object corresponding to an underlying asset having an associated trading symbol and including associated trading symbol data object attributes corresponding to different options contracts for the underlying asset having the associated trading symbol;

a processing system that includes at least one hardware processor, the processing system configured to:

(a) process the input data sets using a predictive machine learning model to predict for a predetermined future time period a set of trading symbol data objects, each trading symbol data object having predicted future trading symbol data object attribute values including a predicted future volume of option contract trading activity for the trading symbol for the predetermined future time period;

(b) sort the set of trading symbol data objects based on the predicted future trading symbol data object attribute values to generate a current, ranked list of trading symbol data objects with predicted future trading symbol data object attribute values including predicted future volumes of option contract trading activity for each trading symbol for the predetermined future time period;

(c) modify the current, ranked list of trading symbol data objects to account for a prior ranking of trading symbol data objects to generate a modified, ranked list of trading symbol data objects with predicted future trading symbol data object attribute values including predicted future volumes of option contract trading activity for each trading symbol for the predetermined future time period;

(d) replace a subset of lower ranked trading symbol data objects from the prior ranking of trading symbol data objects with a subset of higher ranked trading symbol data objects from the modified, ranked list of trading symbol data objects with predicted future trading symbol data object attribute values to generate a new ranking of trading symbol data objects with predicted future trading symbol data object attribute values including predicted future volumes of option contract trading activity for each trading symbol for the predetermined future time period;

(e) calculate one or more performance metrics for trading symbol data objects in the new ranking of trading symbol data objects relative to trading symbol option listings for the trading symbol actually traded over the predetermined future time period for each of the trading symbol data objects in the new ranking of trading symbol data objects;

(f) retrain the predictive machine learning model based on the one or more performance metrics indicating a need to improve performance of the predictive machine learning model;

(g) allocate computer system resources for the new ranking of trading symbol data symbols for the predetermined time period; and (h) generate and output a display or a file including the new ranking of trading symbol data objects.

2. The computer system in claim 1, wherein the processing system is configured to iterate (a)-(f) as a part of retraining the predictive machine learning model.

3. The computer system in claim 1, wherein the processing system is configured to:

process the input data sets to generate formatted input data for the predictive machine learning model.

4. The computer system in claim 1, wherein the processing system is configured to sort the set of trading symbol data objects by highest predicted future trading symbol data object attribute value corresponding to predicted future volumes of option contract trading activity for each trading symbol for the predetermined future time period.

5. The computer system in claim 1, wherein the processing system is configured to:

process the input data sets using the predictive machine learning model to predict for the predetermined future time period a first list of trading symbol data objects with predicted future trading symbol data object attributes including predicted future volumes of option contract trading activity for each trading symbol for the predetermined future time period and a second list of trading symbol data objects with predicted future trading symbol data object attributes including predicted future volumes of option contract trading activity for each trading symbol for the predetermined future time period, and perform (b)-(d) using the first list of trading symbol data objects and the second list of trading symbol data objects.

6. The computer system in claim 1, wherein the processing system is configured to divide the current, ranked list of predicted future values for the trading symbol data objects into a first set of trading symbol data objects to be added to the new ranking of trading symbol data objects and a second set of trading symbol data objects to be removed from the new ranking of trading symbol data objects.

7. The computer system in claim 1, wherein the trading symbol data object attributes include a date, a strike price, and quantity or amount associated with one of the trading symbol data objects.

8. The computer system in claim 1, wherein the processing system is configured to replace the subset of lower ranked trading symbol data objects from the prior ranking of trading symbol data objects with the subset of higher ranked trading symbol data objects from the modified ranked list of predicted selection values based on one or both of:

replacement rules; and replacement parameters.

9. The computer system in claim 8, wherein the processing system is configured to adjust one or both of the replacement rules and the replacement parameters based on the one or more performance metrics.

10. The computer system in claim 8, wherein the processing system is configured to modify the current ranked list of predicted values to account for an impact associated with a trading symbol data object's prior status or other extenuating conditions to generate a modified, ranked list of predicted values.

11. A method to optimize allocation of computer and data communication resources for listing option contracts on an electronic trading platform, comprising:

storing in at least one memory input data sets from one or more trading source computers communicating with the data communications network, where each of the input data sets includes trading symbol data objects, each trading symbol data object corresponding to an underlying asset having an associated trading symbol and including associated trading symbol data object attributes corresponding to different options contracts for the underlying asset having the associated trading symbol;

at a processing system that includes at least one hardware processor:

(a) process the input data sets using a predictive machine learning model to predict for a predetermined future time period a set of trading symbol data objects, each trading symbol data object having predicted future trading symbol data object attribute values including a predicted future volume of option contract trading activity for the trading symbol for the predetermined future time period;

(b) sort the set of trading symbol data objects based on the predicted future trading symbol data object attribute values to generate a current, ranked list of trading symbol data objects with predicted future trading symbol data object attribute values including predicted future volumes of option contract trading activity for each trading symbol for the predetermined future time period;

(c) modify the current, ranked list of trading symbol data objects to account for a prior ranking of trading symbol data objects to generate a modified, ranked list of trading symbol data objects with predicted future trading symbol data object attribute values including predicted future volumes of option contract trading activity for each trading symbol for the predetermined future time period;

(d) replace a subset of lower ranked trading symbol data objects from the prior ranking of trading symbol data objects with a subset of higher ranked trading symbol data objects from the modified, ranked list of trading symbol data objects with predicted future trading symbol data object attribute values to generate a new ranking of trading symbol data objects with predicted future trading symbol data object attribute values including predicted future volumes of option contract trading activity for each trading symbol for the predetermined future time period;

(e) calculate one or more performance metrics for trading symbol data objects in the new ranking of trading symbol data objects relative to trading symbol option listings for the trading symbol actually traded over the predetermined future time period for each of the trading symbol data objects in the new ranking of trading symbol data objects;

(f) retrain the predictive machine learning model based on the one or more performance metrics indicating a need to improve performance of the predictive machine learning model;

(g) allocate computer system resources for the new ranking of trading symbol data symbols for the predetermined time period; and (h) generate and output a display or a file including the new ranking of trading symbol data objects.

12. The method in claim 11, further comprising iterating (a)-(f) as a part of retraining the predictive machine learning model.

13. The method in claim 11, further comprising:

processing the input data sets using the predictive machine learning model to predict for the predetermined future time period a first list of trading symbol data objects with predicted future trading symbol data object attributes including predicted future volumes of option contract trading activity for each trading symbol for the predetermined future time period and a second list of trading symbol data objects with predicted future trading symbol data object attributes including predicted future volumes of option contract trading activity for each trading symbol for the predetermined future time period, and performing (b)-(d) using the first list of trading symbol data objects and the second list of trading symbol data objects.

14. The method in claim 11, further comprising replacing the subset of lower ranked trading symbol data objects from the prior ranking of trading symbol data objects with the subset of higher ranked trading symbol data objects from the modified ranked list of predicted selection values based on one or both of:

replacement rules, replacement parameters.

15. The method in claim 11, further comprising adjusting one or both of the replacement rules and the replacement parameters based on the one or more performance metrics.

16. The method in claim 11, further comprising modifying the current ranked list of predicted values to account for an impact associated with a trading symbol data object's prior status or other extenuating conditions to generate a modified ranked list of predicted values.

17. A non-transitory, computer-readable medium encoded with instructions that, when executed by at least one hardware processor, cause the at least one hardware processor to perform operations to optimize, using machine learning and predictive control, allocation of computer and data communication resources for listing option contracts on an electronic trading platform, comprising:

(a) receiving input data sets including trading symbol data objects, received over a data communications network from one or more trading source computers communicating with the data communications network, each trading symbol data object corresponding to an underlying asset having an associated trading symbol and including associated trading symbol data object attributes corresponding to different options contracts for the underlying asset having the associated trading symbol;

(b) processing the input data sets using a predictive machine learning model to predict for a predetermined future time period a set of trading symbol data objects, each trading symbol data object having predicted future trading symbol data object attribute values including a predicted future volume of option contract trading activity for the trading symbol for the predetermined future time period;

(c) ranking the set of trading symbol data objects based on the predicted future trading symbol data object attribute values to generate a current, ranked list of trading symbol data objects with predicted future trading symbol data object attribute values including predicted future volumes of option contract trading activity for each trading symbol for the predetermined future time period;

(d) modifying the current, ranked list of trading symbol data objects to account for a prior ranking of trading symbol data objects to generate a modified, ranked list of trading symbol data objects with predicted future trading symbol data object attribute values including predicted future volumes of option contract trading activity for each trading symbol for the predetermined future time period;

(e) replacing a subset of lower ranked trading symbol data objects from the prior ranking of trading symbol data objects with a subset of higher ranked trading symbol data objects from the modified, ranked list of trading symbol data objects with predicted future trading symbol data object attribute values to generate a new ranking of trading symbol data objects with predicted future trading symbol data object attribute values including predicted future volumes of option contract trading activity for each trading symbol for the predetermined future time period;

(f) calculating one or more performance metrics for trading symbol data objects in the new ranking of trading symbol data objects relative to trading symbol option listings for the trading symbol actually traded over the predetermined future time period for each of the trading symbol data objects in the new ranking of trading symbol data objects;

(g) retraining the predictive machine learning model based on the one or more performance metrics indicating a need to improve performance of the predictive machine learning model;

(h) allocate computer system resources for the new ranking of trading symbol data symbols for the predetermined time period; and (i) generate and output a display or a file including the new ranking of trading symbol data objects.

* * * * *